United States Patent
Li et al.

(10) Patent No.: US 7,493,042 B2
(45) Date of Patent: *Feb. 17, 2009

(54) HIGH-SPEED FIBER-TO-THE-PREMISE OPTICAL COMMUNICATION SYSTEM

(75) Inventors: Wen Li, Fremont, CA (US); Qing Zhu, San Jose, CA (US)

(73) Assignee: Broadway Networks, Ltd., San Jose, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/452,498

(22) Filed: Jun. 14, 2006

(65) Prior Publication Data

US 2007/0264021 A1 Nov. 15, 2007

Related U.S. Application Data

(63) Continuation of application No. 11/413,405, filed on Apr. 28, 2006, now Pat. No. 7,450,848.

(51) Int. Cl.
*H04J 14/00* (2006.01)
(52) U.S. Cl. ............................... 398/68; 398/72; 398/85
(58) Field of Classification Search .............. 398/8–891
See application file for complete search history.

(56) References Cited

U.S. PATENT DOCUMENTS

| | | | |
|---|---|---|---|
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 2002/0039214 A1 | 4/2002 | Ruan | |
| 2002/0067525 A1* | 6/2002 | Sakamoto et al. | 359/124 |
| 2002/0186439 A1 | 12/2002 | Buabbud | |
| 2003/0180049 A1 | 9/2003 | Park | |
| 2004/0033076 A1* | 2/2004 | Song et al. | 398/70 |
| 2004/0091265 A1 | 5/2004 | Kim | |
| 2006/0109875 A1* | 5/2006 | Matsushita et al. | 372/29.02 |
| 2007/0165688 A1* | 7/2007 | Lee et al. | 372/71 |

* cited by examiner

*Primary Examiner*—Dzung D Tran
(74) *Attorney, Agent, or Firm*—Xin Wen

(57) ABSTRACT

An optical communication system including a plurality of transceiver ports each including a transmitter configured to produce a downstream MLM-spectrum signal and a receiver configured to receive an upstream spectrum-sliced signal. The spectrum of the downstream MLM-spectrum signal comprises a plurality of distinct narrow-spectrum peaks each corresponding to a longitudinal mode. The optical communication system also includes a wavelength filter that includes a plurality of branching ports each associated with a specific wavelength channel, wherein each of the branching ports is in connection with a transceiver port and is configured to receive the downstream MLM-spectrum signal from the transmitter and send an upstream spectrum-sliced signal to the receiver, and a common port configured to output a downstream spectrum-sliced signal in response to the downstream MLM-spectrum signal, wherein the spectrum of the downstream spectrum-sliced signal is located in a wavelength channel specifically associated with the branching port at which the downstream MLM-spectrum signal is received.

28 Claims, 15 Drawing Sheets

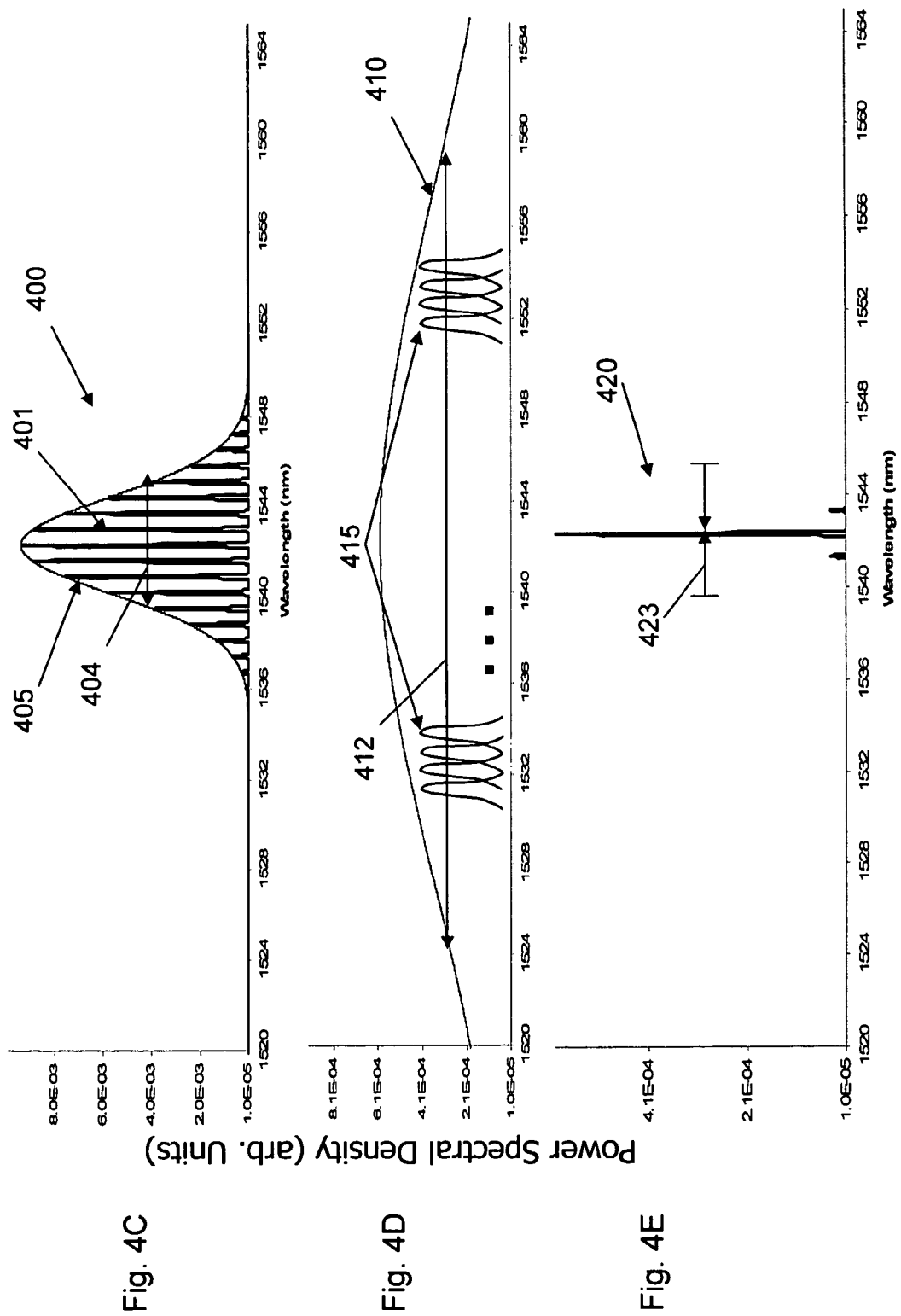

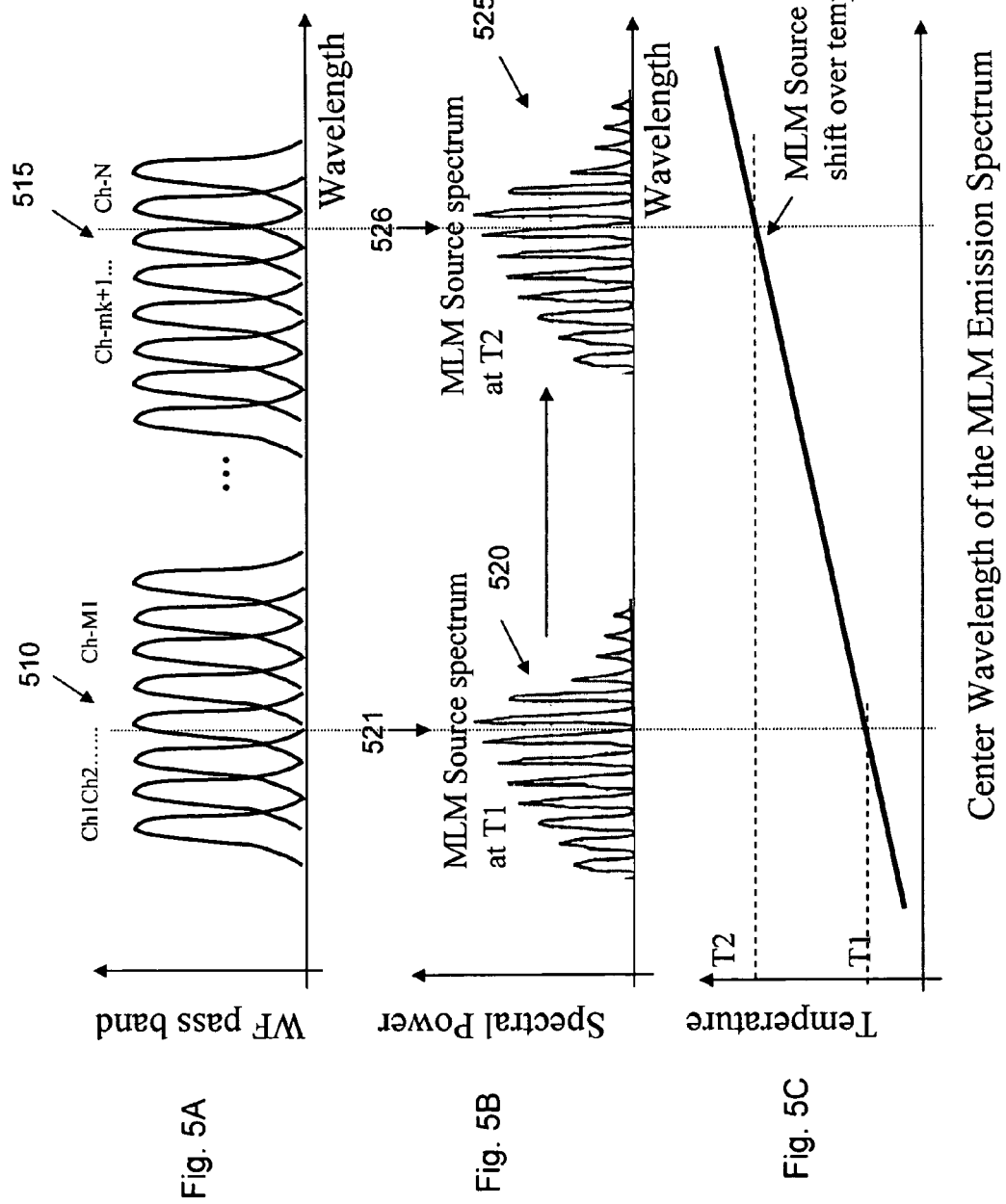

HIGH-SPEED FIBER-TO-THE-PREMISE OPTICAL COMMUNICATION SYSTEM

CROSS REFERENCES TO RELATED APPLICATIONS

This application is a continuation patent application of the commonly assigned U.S. patent application Ser. No. 11/413,405, titled "High speed fiber-to-the-premise optical communication system" by Li et al, filed Apr. 28, 2006 now U.S. Pat. No. 7,450,848. This application is also related to commonly assigned U.S. patent application Ser. No. 11/396,973, titled "Fiber-to-the-premise optical communication system" by Li et al, filed Apr. 3, 2006, the content of which is incorporated herein by reference.

BACKGROUND

The present disclosure relates to optical communication technologies.

As the Internet, voice over Internet Protocol (VoIP), and Internet Protocol television (IPTV) grow in popularity, more and more users desire to have accesses to these services from their premises. The most common local network accesses to these services are the digital subscriber line (DSL) and the cable modem. The DSL and cable networks respectively operate on a pair of copper wires or coaxial cable. While the DSL and the cable modem allow data transfer at up to several million bits per second downstream to a user, the upstream data transfer is usually at lower transfer rate.

Passive optical network (PON) is attractive network architecture for the last-mile access because it does not require active components for directing optical signals between a central office and the network subscribers' terminal equipment. The PON can be divided into three main categories: time division multiplexing (TDM), wavelength division multiplexing (WDM), and a combination of TDM and WDM.

Fiber to the premises (FTTP) is a desirable architecture for providing access from the user's premises. FTTP takes optical fibers all the way into the user's home or premises. Currently, time-division-multiplexing passive optical networks (TDM-PON) are the primary deployment methods for FTTP. TDM-PON is a point-to-multipoint architecture utilizing an optical power splitter at a remote node. TDM-PON delivers downstream information through broadcasting and bandwidth sharing, and receives upstream information via time division multiple access (TDMA). One drawback with TDM-PON is associated with the low security of the broadcasted downstream signals. The complexity of the TDMA protocols also makes TDM-PON undesirable for the next generation user-centric high-speed, broadband services.

A recent development in the FTTPs is PON based on wavelength division multiplexing (WDM) technology. FIG. 1 illustrates a conventional WDM-based optical network 100 that includes a pair of WDM filters 108 and 116 for multiplexing and de-multiplexing between an optical line terminal (OLT) 102 and an optical network unit (ONU) 104. The WDM filters 108 and 116 are connected by a feeder fiber 101. The optical line terminal (OLT) 102 can be coupled to a plurality of optical network units (ONUs) 104 via a remote node 106. Each subscriber at an ONU 104 is assigned a separate WDM channel, whereby the channels are routed by a passive WDM filter 116 at the remote node 106. The OLT 102 includes a WDM filter 108 coupled to a plurality of band separators 110-1 . . . 110-N. Each band separator 110-1 . . . 110-N is further coupled to a transmitter 112-1, 112-2 . . . or 112-N and a receiver 114-1, 114-2 . . . or 114-N.

The passive WDM filter 116 at the remote node 106 provides a plurality of channels that each channel terminates at one of the ONU 104. Each ONU 104 includes a band separator 118-1 . . . 118-N each coupled to a transmitter 120-1, 120-2 . . . or 120-N and a receiver 122-1, 122-2 . . . or 122-N. The transmitters 120-1 . . . 120-N at the ONUs 104 provide narrow-spectrum light sources for upstream signals in a band A. The transmitters 112-1 . . . 112-N at the OLT 102 provide narrow-spectrum light source for the downstream signals in a different wavelength band B. The transmitters 120-1 . . . 120-N and 112-1 . . . 112-N can be provided by narrow-spectrum laser diodes with various wavelength tuning and stabilization mechanisms.

The above described conventional WDM-based optical network includes several drawbacks. The wavelength-specific narrow-spectrum light sources such as distributed-feedback (DFB) laser diodes are complex to make and have limited range of wavelength tunability by adjusting the laser operating temperature. The ONU for each subscriber uses at least one such laser. A large number of the wavelength-specific narrow-spectrum light sources are thus required in the conventional WDM-based optical network 100, which typically contains 32 or 40 ONUs. All the DFB laser chips have to be customer designed to the specific wavelength range for each group of a few wavelength channels. The emission center wavelengths of the DFB laser sources typically need to be fine tuned individually by temperature controller using precision spectral instrument to match the ITU wavelength grid of each wavelength channel. The inventory and field installation can become very complex and unmanageable in large-scale deployment for access.

Furthermore, the shift in the narrow spectrum of a wavelength-controlled DFB laser diode relative to the narrow wavelength channels of the DWDM wavelength filter can significantly affect the signal transmission. For example, a fraction of a degree of temperature drift can drive the emission spectrum of a narrow-spectrum laser out of the clear pass band window of the wavelength channel and cause significant loss of transmission signal. The reliability of the precision-controlled narrow-spectrum lasers is therefore a challenge in WDM-PON applications.

SUMMARY

In a general aspect, the present invention relates to an optical communication system, including a) a plurality of transceiver ports each that includes a first transmitter configured to produce a downstream multi-longitudinal mode (MLM)-spectrum signal, wherein the spectrum of the downstream MLM-spectrum signal comprises a plurality of distinct narrow-spectrum peaks each corresponding to a longitudinal mode in the first transmitter; and a first receiver configured to receive an upstream signal; and b) a first wavelength filter that includes a plurality of first branching ports each associated with a specific wavelength channel, wherein each of the first branching ports is in connection with a transceiver port and is configured to receive the downstream MLM-spectrum signal from the first transmitter and send an upstream signal to the first receiver; and a first common port configured to output a downstream spectrum-sliced signal in response to the downstream MLM-spectrum signal, wherein the spectrum of the downstream spectrum-sliced signal is located in a wavelength channel specifically associated with the first branching port at which the downstream MLM-spectrum signal is received.

In yet another general aspect, the present invention relates to an optical communication system, including a) a plurality of transceiver ports each of which includes a first transmitter configured to produce a downstream MLM-spectrum signal, wherein the spectrum of the downstream MLM-spectrum signal comprises a plurality of distinct narrow-spectrum peaks each corresponding to a longitudinal mode; a temperature controller configured to control the first transmitter to stay at a substantially fixed temperature; and a first receiver configured to receive an upstream spectrum-sliced signal; b) a first wavelength filter that includes a plurality of first branching ports each associated with a specific wavelength channel, wherein each of the first branching ports is in connection with a transceiver port and is configured to receive the downstream MLM-spectrum signal from the first transmitter and send an upstream spectrum-sliced signal to the first receiver; and a first common port configured to output a downstream spectrum-sliced signal in response to the downstream MLM-spectrum signal, wherein the downstream spectrum-sliced signal comprises at least one longitudinal mode of the downstream MLM-spectrum signal and the spectrum of the downstream spectrum-sliced signal is located in a wavelength channel specifically associated with the first branching port at which the downstream MLM-spectrum signal is received; and c) a second wavelength filter that includes a plurality of second branching ports each associated with a specific wavelength channel, wherein each of the second branching ports is configured to receive an upstream MLM-spectrum signal from an optical network unit; and a second common port configured to output the upstream spectrum-sliced signal in response to the upstream MLM-spectrum signal, wherein the spectrum of the upstream spectrum-sliced signal comprises at least one longitudinal mode of the upstream MLM-spectrum signal and the spectrum of the upstream spectrum-sliced signal is located in a wavelength channel specifically associated with the second branching port at which the upstream MLM-spectrum signal is received, and wherein the second common port is configured to receive the downstream spectrum-sliced signal from the first wavelength filter and the downstream spectrum-sliced signal is routed to one of the second branching ports that is specifically associated with the wavelength channel of the downstream spectrum-sliced signal.

Implementations of the system may include one or more of the following. The plurality of distinct narrow-spectrum peaks in the spectrum of the downstream MLM-spectrum signal can be characterized by an envelope whose full-width at half the maximum (FWHM) is equal to or greater than 1 nanometer. The spacing between two adjacent narrow-spectrum peaks in the spectrum of the downstream MLM-spectrum signal can be less than the spacing between two adjacent wavelength channels associated with the branching ports of the first wavelength filter. The downstream spectrum-sliced signal can include at least one longitudinal mode of the downstream MLM-spectrum signal. The first transmitter can be a Fabry-Perot laser or a super luminescent diode. At least one of the transceiver ports can include a temperature controller configured to control the temperature of the first transmitter in the associated first transceiver. The temperature of the first transmitter can be set to a predetermined temperature by the temperature controller in response to an external signal. The optical communication system can further include an optical amplifier configured to receive the downstream spectrum-sliced signal from the first common port and to send an amplified downstream spectrum-sliced signal to a second wavelength filter. The optical amplifier can include only passive components and is energized by an external pump source. The first wavelength filter and the optical amplifier can be co-located in an optical line terminal. The optical communication system can further include an optical amplifier configured to receive an upstream signal from the second wavelength filter and to send an amplified upstream signal to the first common port of the first wavelength filter, wherein the first wavelength filter is configured to route the amplified upstream signal to one of the first branching ports in accordance with the wavelength channel of the amplified upstream signal. At least one of the transceiver ports can include a first signal separating/combining device configured to receive the downstream MLM-spectrum signal from the first transmitter and to send the downstream MLM-spectrum signal to the associated first branching port in the first wavelength filter, and configured to receive the upstream signal from the associated first branching port in the wavelength filter and to send the upstream signal to the first receiver. The first wavelength filter can be configured to route the upstream signal received at the first common port to one of the first branching ports such that the central wavelength of the upstream signal matches the specific wavelength channel associated with the one of the first branching ports. The optical communication system can further include a second wavelength filter that includes a plurality of second branching ports each associated with a specific wavelength channel, wherein each of the second branching ports is configured to receive an upstream MLM-spectrum signal from an optical network unit; and a second common port configured to output the upstream spectrum-sliced signal in response to the upstream MLM-spectrum signal, wherein the spectrum of the upstream spectrum-sliced signal is located in a wavelength channel specifically associated with the second branching port at which the upstream MLM-spectrum signal is received. The second common port can be configured to receive the downstream spectrum-sliced signal from the first wavelength filter and the downstream spectrum-sliced signal is routed to one of the second branching ports that is specifically associated with the wavelength channel of the downstream spectrum-sliced signal. The optical network unit includes a second receiver configured to receive the downstream spectrum-sliced signal from the second branching port in connection with the optical network unit. The optical network unit can include a second transmitter configured to produce the upstream MLM-spectrum signal to be sent to the second branching port in connection with the optical network unit, wherein the spectrum of the upstream MLM-spectrum signal comprises a plurality of distinct narrow-spectrum peaks each corresponding to a longitudinal mode in the second transmitter. The spacing between two adjacent narrow-spectrum peaks in the spectrum of the upstream MLM-spectrum signal can be less than the spacing between two adjacent wavelength channels associated with the branching ports of the second wavelength filter. The upstream spectrum-sliced signal can include one or more longitudinal modes of the upstream MLM-spectrum signal. The plurality of distinct narrow-spectrum peaks in the spectrum of the upstream MLM-spectrum signal can be characterized by an envelope whose full-width at half the maximum (FWHM) is equal to or greater than 1 nanometer. The optical network unit can include a temperature controller configured to control the temperature of the second transmitter. The temperature of the second transmitter can be set to a predetermined temperature by the temperature controller in response to an external signal.

Embodiments may include one or more of the following advantages. The disclosed optical communication system can include only passive devices between the central office and the user's premises, which significantly reduces complexity and maintenance comparing to some conventional systems that use active devices in the field. The use of passive devices in the fields also improves the system reliability of the optical communication system.

The disclosed optical communication system overcomes the drawbacks associated with the wavelength-controlled narrow-spectrum light sources in the conventional systems. The disclosed optical communication system uses temperature-stabilized multi-longitudinal mode (MLM) light sources such as Fabry-Perot lasers or temperature-stabilized superluminescent diodes (SLD) as optical transmitters. The MLM sources have much broader emission envelops than that of the narrow-spectrum light sources (i.e. DFB lasers) in the conventional DWDM based optical communication systems. The MLM light sources also have larger wavelength tuning range with temperature comparing to the narrow-spectrum DFB sources. The broad emission envelope and a wide wavelength tunable range of the MLM light source allows the same specification transmitters to be used for 32, 40, or even more of the wavelength channels of a typical 100 GHz-spacing wavelength filter, which eliminates the needs for maintaining a large inventory of wavelength-specific transmitters.

The disclosed optical communication system based on MLM light sources also exhibits robust performance. The spectral spacing between the MLM modes is smaller than the spacing between the wavelength channels. Small temperature shift that causes certain MLM modes to move out of the pass band of the wavelength channel can be simultaneously compensated by other modes move into the pass band. This design feature significantly relaxes the precision for the temperature control for locking the emission wavelengths of the MLM light sources.

Furthermore, the MLM light sources in the disclosed optical communication system can be self-adaptive through built-in control capabilities. The broad emission envelope of the MLM light sources in the disclosed optical communication system can be shifted by adjusting the temperature at which the MLM light sources are stabilized. Such temperature control and wavelength tuning can be automatically carried out in the system interactively or dynamically prior to or during the normal operation. The transmitter having built-in self-adaptive feature is critical for large scale deployment especially with vast number of ONU's in the field. The disclosed system based on MLM sources can achieve high speed of data transmission under outdoor uncontrolled environment. For example, the disclosed optical communication system can achieve data rate of several Gigabits per second (Gbps) per ONU, which is an order of magnitude higher than other PON system. The disclosed system can provide bandwidth capacity, system stability, and robustness unmatched by conventional WDM-PON systems based on other types of transmitter configurations, for example, injection-locked laser or reflective semiconductor optical amplifier (RSOA).

Another advantage of the disclosed optical communication system is that it provides flexibility for network configuration, integration, and management. The disclosed optical communication system is agnostic to different communication protocols. Unlike conventional TDM-PON systems that need extra protocols (TDMA, RANGING) between optical layer and data layer, the signal transmission between the OLT and ONU in the disclosed optical communication system operates in a continuous mode and each ONU occupies a dedicated channel. The system can naturally adapt to any communication protocols at any bit-rate.

Yet another advantage of the disclosed optical communication system is that each ONU can communicate in an independent channel. The bandwidth capacity for each ONU can be upgraded without changing the overall optical communication system and at minimal incremental cost, which greatly extends the lifetime of the installed devices and components. In contrast, the downstream and upstream bandwidths are shared by all users in a conventional PON (or TDM-PON) system. Any bandwidth increase for one user will affect the resource allocation and the operation of the entire system. The conventional PON (or TDM-PON) is thus not scalable and extremely bit-rate and protocol dependent. Thus the disclosed optical communication system can provide much improved bandwidth scalability, upgrade flexibility and performance robustness.

Each ONU in the disclosed system occupies a unique wavelength channel. The channel spacing can be anywhere from tens of nanometers (in the case of CWDM) to a few hundred picometers (in the case of DWDM). Dispersion and optical non-linear effects usually have less impact on signal quality because of the short distance in the access applications. Because of the cyclic characteristic of the wavelength filter (AWG), hundreds of wavelength channels can potentially be used for network expansion. In addition, each wavelength channel can operate independently in continuous mode. The bandwidth for each ONU can be upgraded from 100 Mbps to 1 Gbps, 2.5 Gbps, or even higher. The total throughput of one WDM-PON can be as high as 40~100 Gbps, which provides much needed bandwidth for future expansions.

The disclosed optical communication system includes a number of other advantages. The disclosed optical communication system can provide symmetrical bandwidths for downstream and upstream signals. The bandwidth symmetry allows high bit-rate data transfers both downstream and upstream directions, which is a significant improvement over TDM-PONs (APON, BPON, EPON and GPON) and the conventional systems based on DSL and cable modems. The disclosed optical communication system also provides excellent network security and communication privacy because each ONU occupies a distinct wavelength channel and is physically isolated from other wavelength channels at optical layer.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and from a part of the specification, illustrate embodiments of the present invention and, together with the description, serve to explain the principles of the invention.

FIGS. 4C illustrates the emission spectrum of a typical MLM source.

FIG. 4D illustrates the emission spectrum of a broad-spectrum source and the pass bands of a wavelength filter.

FIG. 4E illustrates the emission spectrum of a narrow-spectrum source.

FIG. 5A illustrates the spectral distribution of the wavelength channels of the wavelength filters.

FIG. 5B illustrates the spectrum of a MLM source at two different temperatures $T_1$ and $T_2$.

FIG. 5C illustrates the temperature dependence of the center wavelength of a typical MLM source.

DETAILED DESCRIPTION

Figure 1:
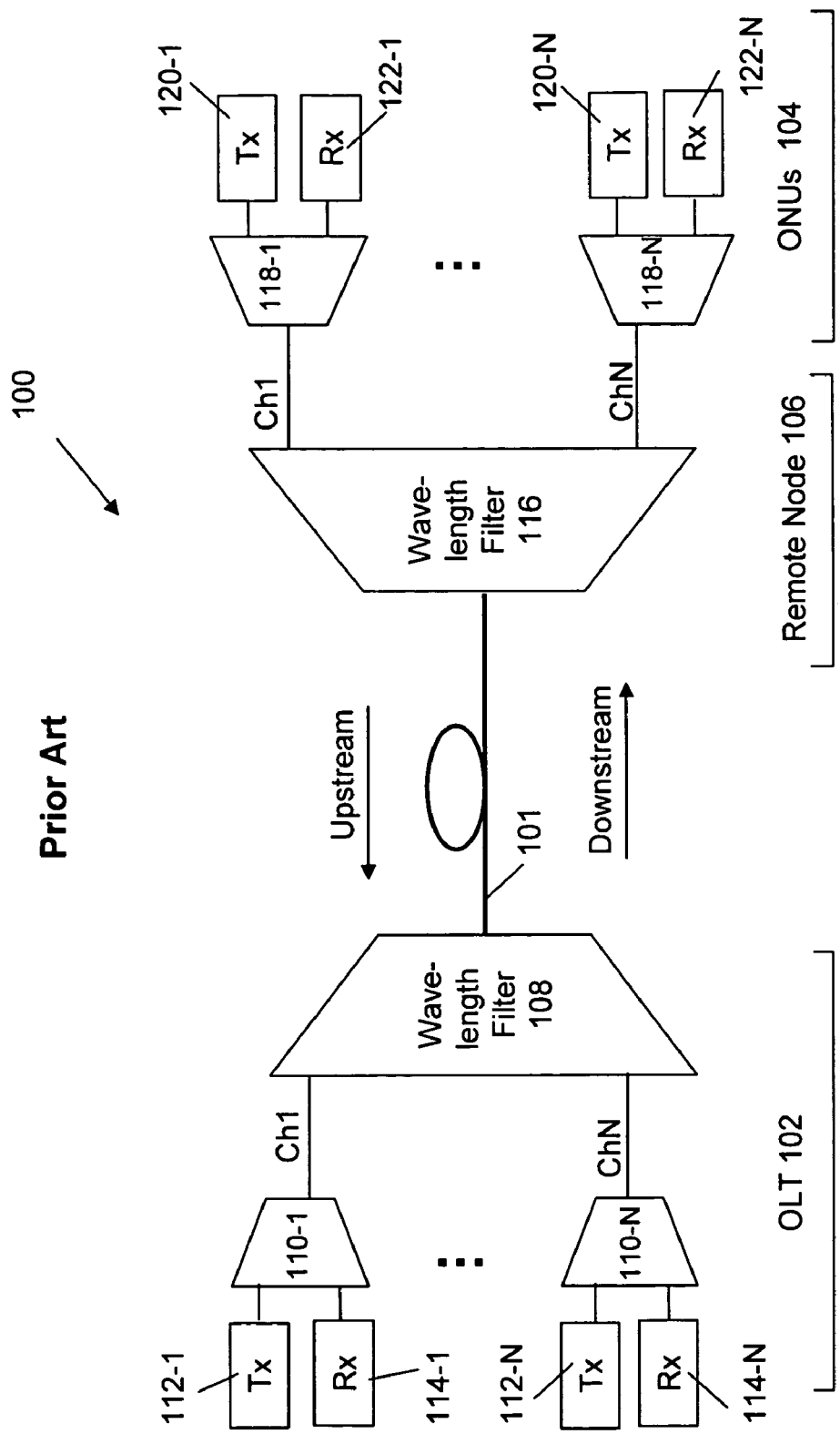
FIG. 1 is a block diagram of a conventional WDM-based optical network.
Figure 2A:
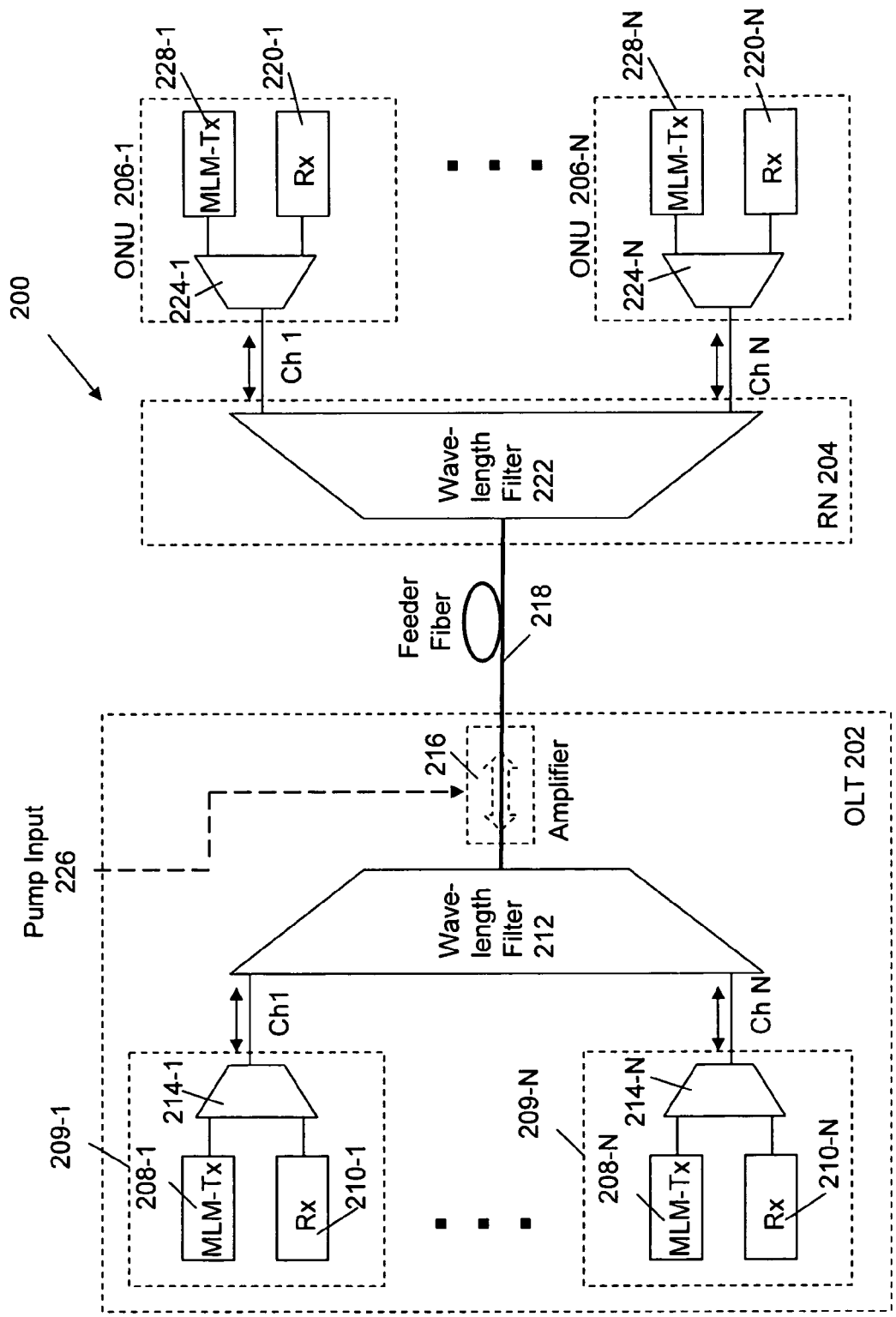
FIG. 2A is a block diagram of an optical communication system using MLM sources as transmitters in accordance to an embodiment of the present specification.

FIG. 2A shows an optical communication system 200 in accordance with an embodiment of the present invention. The optical communication system 200 includes an OLT 202, a remote node (RN) 204 in connection with the OLT 202 through an optical network, and a plurality of ONUs 206 in connection with the RN 204.

The optical communication system 200 includes two symmetric wavelength filters: a wavelength filter 212 in the OLT 202 and a wavelength filter 222 at the RN 204. The wavelength filter 212 and the wavelength filter 222 are wavelength division multiplexing (WDM) filters. The wavelength filters 212 and 222 can be implemented by arrayed-waveguide gratings (AWG) that can be tuned to the common communication bands, including O, E, S, C, L or U-band and typically follow the wavelength grids of International Telecommunication Union (ITU). The wavelength filters 212 or 222 can also be based on other forms of WDM filters such as thin-film DWDM and CWDM filters.

Figure 2B:
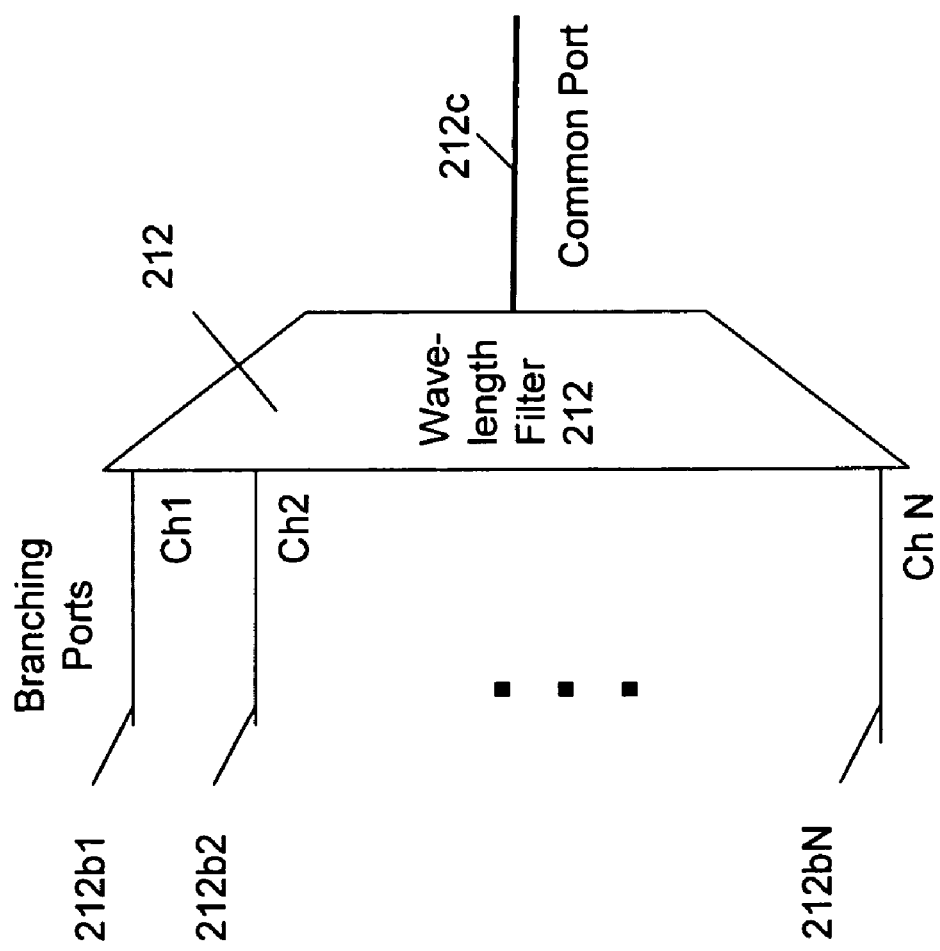
FIG. 2B is a detailed view of the wavelength filter in the optical line terminal in the optical communication system of FIG. 2A.
Figure 2C:
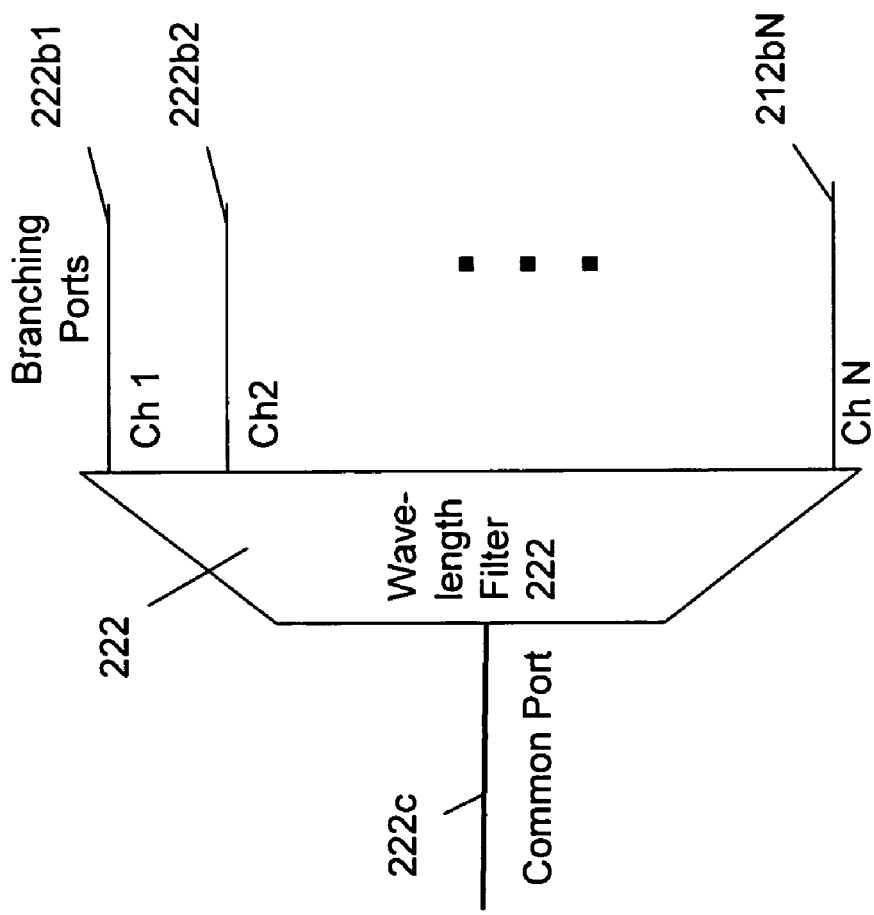
FIG. 2C is a detailed view of the wavelength filter in the remote node in the optical communication system of FIG. 2A.

The wavelength filter 212 or 222 can receive MLM source signals at separate branching ports (i.e. 212b1, 212b2 ... 212bN and 222b1, 222b2 ... 222bN as shown FIGS. 2B and 2C) as inputs and filter (or slice) the MLM source signals to output multiplexed spectrum-sliced signals at the common ports (i.e. 212c, and 222c in FIGS. 2B and 2C) of the wavelength filter 212 or 222. Each of the spectrum-sliced signals carries data from the respective input MLM source signals. The output spectrum-sliced signals are respectively located in a plurality of predetermined wavelength channels "Ch1", "Ch3" ... "ChN" identical to both wavelength filters 212 and 222. The wavelength channels "Ch1", "Ch2" ... "ChN" are determined by the pass bands of the wavelength filters 212 and 222, and characterized by the unique channel center wavelengths ($\lambda_{Ch1}, \lambda_{Ch2} \ldots \lambda_{ChN}$), pass band width and optical isolation between each wavelength channel. The adjacent channel spacing ($|\lambda_{Chi}-\lambda_{Chi-1}|$, i=2,3 ... N) between the wavelength channels "Ch1", "Ch2" ... "ChN" of the filters 212 or 222 can range from a few tens to a few thousands of gigahertz.

A detailed view of the wavelength filter 212 in the OLT 202 is shown in FIG. 2B. The wavelength filter 212 includes a plurality of branching ports 212b1, 212b2 ... and 212bN, and a common port 212c. Each of the branching ports 212b1, 212b2 ... or 212bN is associated with a distinct and specific wavelength channel "Ch1", "Ch2" ... or "ChN". The wavelength filter 212 can receive a downstream MLM source signal at a branching ports 212b1, 212b2 ... or 212bN, and filter (or slice) the spectrum of the downstream MLM source signal. The wavelength filter 212 then outputs a downstream spectrum-sliced signal at the common port 212c. The spectrum of the downstream spectrum-sliced signal is located in the specific wavelength channel associated with the branching port 212b1, 212b2 ... or 212bN at which the downstream MLM source signal is received. In other words, the spectrum of the downstream spectrum-sliced signal output at the common port 212c is determined by the wavelength channel associated with the branching port 212b1, 212b2 ... or 212bN at which the input downstream broad-spectrum signal is received.

The wavelength filter 212 can also process optical signals in the reverse direction. An upstream spectrum-sliced signal (received from the wavelength filter 222 via the feeder fiber 218 and the optional optical amplifier 216) can be received at the common port 212c. The upstream spectrum-sliced signal is characterized by a spectrum in a specific wavelength channel "Ch1" or "Ch2" ... "ChN". The wavelength filter 212 can route the upstream spectrum-sliced signal to one of the branching ports 212b1, 212b2 ... or 212bN in accordance with the wavelength channel of the upstream spectrum-sliced signal. The routing is so arranged that the wavelength channel of the upstream spectrum-sliced signal matches the wavelength channel of the receiving branching port 212b1, 212b2 ... or 212bN. The upstream spectrum-sliced signal routed to a branching port 212b1, 212b2 ... or 212bN is subsequently transmitted to one of the transceiver ports 209-1, 209-2, or 209-N.

The central wavelength of an AWG can be sensitive to temperature variations. In one implementation, the wavelength filters 212 or 222 can be based on athermal AWGs, which become commercially available recently. The athermal AWGs have various temperature compensation mechanisms and allow the AWG-based wavelength filters 212 and 222 to be insensitive to temperature variations and to be installed in an environment without temperature control. This capability of the disclosed optical communication system can significantly reduce the complexity and cost for field installations.

The optical communication system 200 further includes a plurality of transceiver ports 209-1, 209-2 ... 209-N that can reside in the OLT 202. Each transceiver port 209-1, 209-2 ... 209-N can include a transmitter 208-1 (or 208-2 ... 208-N) for providing MLM downstream optical signals and a receiver 210-1 (or 210-2 ... 210-N) for receiving upstream optical signals. Each transceiver port 209-1, 209-2, ... 209-N is connected with one of the branching ports 212b1, 212b2 ... 212bN of the wavelength filter 212 and is thus associated with a specific wavelength channel "Ch1", "Ch2" ... "ChN" of the wavelength filter 212. The wavelength filter 212 can be coupled with the transceiver ports 209-1, 209-2, . . . 209-N by single-mode optical fibers. The MLM signals produced by the transmitters 208-1, 208-2, . . . 208-N are sliced by the wavelength filter 212 to produce multiplexed spectrum-sliced signals each occupying a wavelength channel specific to the respective branching port 212b1, 212b2 . . . or 212bN of filter 212. The receivers 210-1, 210-2, . . . 210-N are configured to receive spectrum-sliced signals having their wavelength channels specific to the respective branching ports 212b1, 212b2 . . . and 212bN of the wavelength filter 212.

In the present specification, the term "downstream signal" refers to an optical signal sent from service provider's central office to users' premises. The term "upstream signal" refers to an optical signal sent from the users' premises to a central office. The term "MLM source" or "multi-longitudinal mode source" refers to an optical signal that has a spectrum with composite of peaks (modes) wherein the envelope joining the modal peaks having a full-width at half the maximum (FWHM) equal to or greater than 1 nanometer. A "narrow spectrum" refers to an optical signal that has a spectral FWHM of the line profile less than 1 nanometer and also its side modes are suppressed by a minimum of 10 dB. A spectrum-sliced signal refers to the signal sliced (or filtered) from a "MLM source" unless it is otherwise specified. Thus the spectral FWHM of a spectrum-sliced signal is a fraction of the spectral envelope FWHM of the original "MLM source" signal.

The transmitters 208-1, 208-2 . . . 208-N are MLM source transmitters that can be directly modulated to carry the downstream optical signals. One example for the MLM source transmitter is multi-longitudinal mode Fabry-Perot lasers. The transmitters 208-1, 208-2 . . . 208-N also can be implemented by temperature controlled super luminescent diodes (SLD) and its variant. Fabry-Perot (FP) lasers are less costly and much easier to maintain compared to the wavelength-specific narrow-spectrum transmitters (such as DFB lasers) in the convention optical systems are usually provided by wavelength-controlled light sources. The MLM transmitters 208-1, 208-2 . . . 208-N, receivers 210-1 . . . 210-N, and the wavelength filter 212 can be integrated to form a basic building block for bi-directional signal transmission, which can save foot print at OLTs (and analogously at the ONUs) and thus reduce costs.

The transmitters 208-1 . . . 208-N can be modulated at rates ranging from hundreds to thousands of megabit per second (Mbps) modulation speed. The transmitters 208-1 . . . 208-N can provide stable MLM light sources with minimal or no instabilities caused by external optical feedback or back-reflection. The center wavelengths (CW) of the common MLM source signals can be designed anywhere in the optical spectrum of the communication window for the common optical fibers, which can be from 1100 nm to 1700 nm.

Figure 2D:
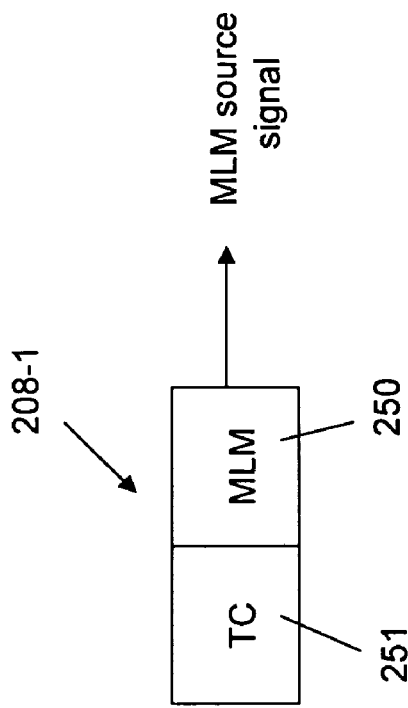
FIGS. 2D and 2E illustrate details of the MLM transmitters in an OLT and an ONU.

An advantage of the use of MLM source in the optical communication system 200 is that the transmitter 208-1 . . . 208-N and the transmitter 228-1 . . . 228-N can be easily tuned and locked in signal center wavelength that cover a large number of individual wavelength channels. The center wavelength of each MLM source can be stabilized by a temperature controller. As shown in FIG. 2D, the transmitter 208-1 in the OLT 202 can include a multi-longitudinal mode source (MLM) 250 and a temperature controller 251. MLM 250 is in thermal contact with the temperature controller 251. The temperature controller 251 can be thermal electric temperature controller built in the MLM source 208-1.

The broad envelope of the emission spectrum combining the fine pith of mode-spacing of the MLM source means that MLM source does not need very accurate control temperature as the DFB lasers. The DFB lasers typically require temperature control to achieve a wavelength accuracy within 0.1 nanometer. The MLM source in the disclosed system has much more tolerance. The MLM sources suitable for transmitters transmitter 208-1 . . . 208-N and the transmitter 228-1 . . . 228-N can accept wavelength accuracy >0.1 nanometer or even a few nanometers. The temperature controller 251 (and 261) can thus be implemented by much simpler and less costly controller devices compared to the temperature controlling devices for the narrow-wavelength lasers in the conventional systems. As discussed in more detail below, the wavelength tuning of the MLM sources can be fully automatic. The emission spectra for transmitters 208-1 . . . 208-N and the transmitter 228-1 . . . 228-N can be controlled by simply setting the control temperature to their corresponding set points, which could be sufficient to cover all the wavelength channels of the wavelength filters 212 and 222.

The MLM sources in the disclosed system are designed with criteria closely tied with the wavelength channel spacing of the wavelength filters 212 and 222. The side-modes in the MLM source are not suppressed; instead it is a crucial design specification for achieving desirable spectrum-slicing effects by the wavelength filter.

The wavelength filter 212 can receive the MLM source optical signals produced by the transmitter 208-1 . . . 208-N and filter (or slice) the MLM source optical signals to produce multiplexed spectrum-sliced optical signals at the common port 212c. The spectrum of each MLM source optical signal is specifically associated with the branching port 212b1, 212b2 . . . and 212bN of the wavelength filter Ch1 . . . ChN to which the MLM source signal is transmitted.

The wavelength filters 212 and 222 based on AWGs can be cyclic over a wavelength range. The pass band for a spectrum-slicing channel (Ch1, Ch2 . . . and ChN) can be cyclic in the optical spectrum. Each channel (Ch1, Ch2 . . . ) can have multiple pass-band peaks separated by a free spectral range (FSR). The periodicity or free spectral range (FSR) can be varied by design. Furthermore, the FSR may be designed to be close to the overall AWG pass band width (defined by the wavelength span between the center wavelengths of the first and the last filter channel within the same FSR: $|\lambda_{ChN} - \lambda_{Ch1}|$).

One advantage of the AWG based filters 212 or 222 is that the downstream and upstream traffics can be separated by a wavelength of one or more FSRs for each channel ("Ch1", "Ch2" . . . "ChN"). For example, a bidirectional system can be implemented such that the downstream signals occupy a sequence of center wavelengths—$\lambda_{Ch1}, \lambda_{Ch2} \ldots \lambda_{ChN}$ in C band while upstream signals occupy a sequence of center wavelengths—$(\lambda_{Ch1}+n \times FSR), (\lambda_{Ch2}+n \times FSR) \ldots (\lambda_{ChN}+n \times FSR)$, where n=0 or ±1 or ±2 . . . possibly in a different band.

Each transceiver port 209-1 . . . 209-N can include a signal separating/combining device 214-1 . . . 214-N to assist bi-directional communications in either downstream or upstream directions. These signal separating/combining devices 214-1 . . . 214-N can be implemented by WDM filters, power splitter, and circulators. The signal separating/combining devices 214-1 . . . 214-N are respectively coupled with the transmitter 208-1 . . . 208-N and the receivers 210-1 . . . 210-N in the respective transceiver ports 209-1 . . . 209-N. The signal separating/combining devices 214-1 . . . 214-N are also coupled with the wavelength filters 212, each of which can include a single optical fiber connection. In the implementation of WDM filters, the signal separating/combining devices 214-1 . . . 214-N can use filter function to separate signal in different regions of the FSR for the downstream optical signals from the transmitter 208-1 . . . 208-N and the upstream optical signals to be received by the receivers 210-1 . . . 210-N. Thus the signal separating/combining devices 214-1 . . . 214-N can enable bi-directional transmission of optical signals with a single optical connection to the wavelength filter 212.

The wavelength filter 222, typically mirroring that of the filter 212 in optical specifications, is optically connected with the plurality of ONUs 206-1 . . . 206-N. Each of the ONUs 206-1 . . . 206-N is specifically associated with a counterpart transceiver port 209-1 . . . 209-N in the OLT 202 and is characterized by a specific wavelength channel determined by the filter function of the filters 212 and 222. Each wavelength channel can carry bidirectional signals.

A detailed view of the wavelength filter 222 in the RN 204 is shown in FIG. 2C. The wavelength filter 222 includes a plurality of branching ports 222*b*1, 222*b*2 . . . and 222*b*N, and a common port 222*c*. Each of the branching ports 222*b*1, 222*b*2 . . . and 222*b*N is associated with a distinct and specific wavelength channel "Ch1", "Ch2" . . . or "ChN". Each branching port 222*b*1, 222*b*2 . . . or 222*b*N is respectively connected with an ONU 206-1 . . . 206-N. The wavelength filter 222 can receive an upstream MLM signal at a branching ports 222*b*1, 222*b*2 . . . or 222*b*N from an ONU 206-1 . . . 206-N, and filter (or slice) the spectrum of the upstream MLM signal. The wavelength filter 222 then outputs an upstream spectrum-sliced signal at the common port 222*c* (via feeder fiber 218). The spectrum of the upstream spectrum-sliced signal is located in the specific wavelength channel associated with the branching port 222*b*1, 222*b*2 . . . or 222*b*N at which the upstream broad-spectrum signal is received. In other words, the spectrum of the upstream spectrum-sliced signal output at the common port 222*c* is determined by the wavelength channel associated with the branching port 222*b*1, 222*b*2 . . . or 222*b*N at which the input upstream MLM signal is received.

Each ONU 206-1 . . . 206-N can include a transmitter 228-1 (or 228-2, 228-N) for providing a MLM upstream optical signals and a receiver 220-1 (or 220-2, 220-N) for receiving downstream optical signals. Each ONU 206-1, 206-2 . . . 206-N is connected with a branching port 222*b*1, 222*b*2 . . . 222*b*N of the wavelength filter 222 and is associated with a specific wavelength channel "Ch1", "Ch2" . . . "ChN" of the wavelength filter 222. The wavelength filter 222 can be coupled with the ONUs 206-1 . . . 206-N by single-mode optical fibers. The MLM signals produced by the transmitters 228-1 . . . 228-N are sliced by the wavelength filter 222 to produce multiplexed upstream signals with specific wavelength channels determined by the branching ports 222*b*1, 222*b*2 . . . and 222*b*N of the wavelength filter 222.

The wavelength filter 222 can receive downstream spectrum-sliced signal via the feeder fiber 218 at the common port 222*c*. The downstream spectrum-sliced signal is characterized by a wavelength channel of one of the branching ports 212*b*1, 212*b*2 . . . and 212*b*N of the wavelength filter 212. The wavelength filter 222 can route the downstream spectrum-sliced signal to one of the branching ports 222*b*1, 222*b*2 . . . or 222*b*N in accordance with the wavelength channel of the downstream spectrum-sliced signal such that the wavelength channel of the downstream spectrum-sliced signal matches the wavelength channel of the receiving branching port 222*b*1, 222*b*2 . . . or 222*b*N. The downstream spectrum-sliced signal routed to a branching port 222*b*1, 222*b*2 . . . or 222*b*N is subsequently transmitted to one of the ONUs 206-1 . . . 206-N.

The receivers 220-1 . . . 220-N in the ONUs 206-1 . . . 206-N are configured to receive downstream signals that are transmitted through the specific filter channel. As an example, the ONU 206-1 and the OLT 209-1 share the same wavelength channel—"Ch1". The ONU 206-2 and the transceiver port 209-2 share the same wavelength channel "Ch2", and so on. Each ONU 206-1 . . . 206-N includes a signal separating/combining device 224-1 (or 224-2 . . . 224-N), a transmitter 228-1 (or 228-2 . . . 228-N), and a receiver 220-1 (or 220-2 . . . 220-N).

Figure 2E:
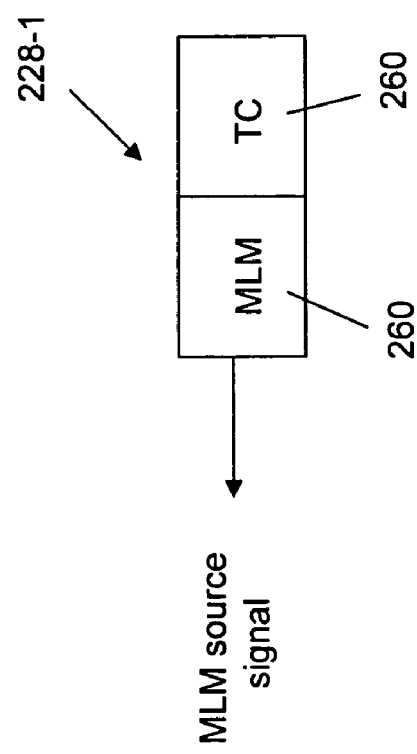

The transmitters 228-1 . . . 228-N can be MLM sources, which may have different implementations from the transmitter 208-1 . . . 208-N. FIG. 2E shows an exemplified implementation of the transmitter 228-1 at the ONU 206-1. The transmitter 218-1 includes a MLM source 260 and a temperature controller 261 that can control the temperature of the MLM source 260. The temperature controller 261 can be a thermal electric temperature controller that is built in the MLM transmitter 228.

It should be noted that although an ONUs 206-1 . . . 206-N and its counterpart transceiver port 209-1 . . . 209-N in the OLT 202 share the communication tasks in each channel "Ch1", "Ch2" . . . or "ChN", they do not have to operate in the same wavelength range for both downstream and upstream transmission. For example, utilizing the cyclic features in the case of AWGs as the wavelength filters 212 and 222, the downstream and upstream signals can occupy different wavelengths, which are separated by a multiple of FSRs.

The transmitter 228-1 . . . 228-N can produce MLM upstream signals to be sent to the common port 222*c* at the wavelength filter 222 wherein the MLM upstream signals are sliced (or filtered) into specific wavelength channels. For example, the MLM upstream signal from the ONU 206-1 is filtered by the wavelength filter 222 to produce a spectrum-sliced upstream signal in the wavelength channel "Ch1" that is also specific to the transceiver port 209-1. The spectrum-sliced upstream signal can be amplified if necessary, passing through the wavelength filter 212 and the signal separating/combining device 214-1, and being received by the receiver 210-1 in the transceiver port 209-1.

In the downstream direction, the MLM optical signal produced by the transmitter 208-1 passes the signal separating/combining device 214-1 and is sliced (or filtered) by the wavelength filter 212 into a spectrum-sliced downstream signal in the wavelength channel "Ch1". The spectrum-sliced downstream signal is next amplified if necessary and transmitted to the wavelength filter 222 at the RN 204. The wavelength filter 222 then routes the spectrum-sliced downstream signal in "Ch1" to the ONU 206-1 that is characterized by the same wavelength channel "Ch1". As described, each of the ONUs communicates downstream or upstream in its specific wavelength channel within each system. The secure wavelength specific communications in the disclosed system is a significant improvement over the broadcasting mode of communications in some conventional systems.

Figure 3:
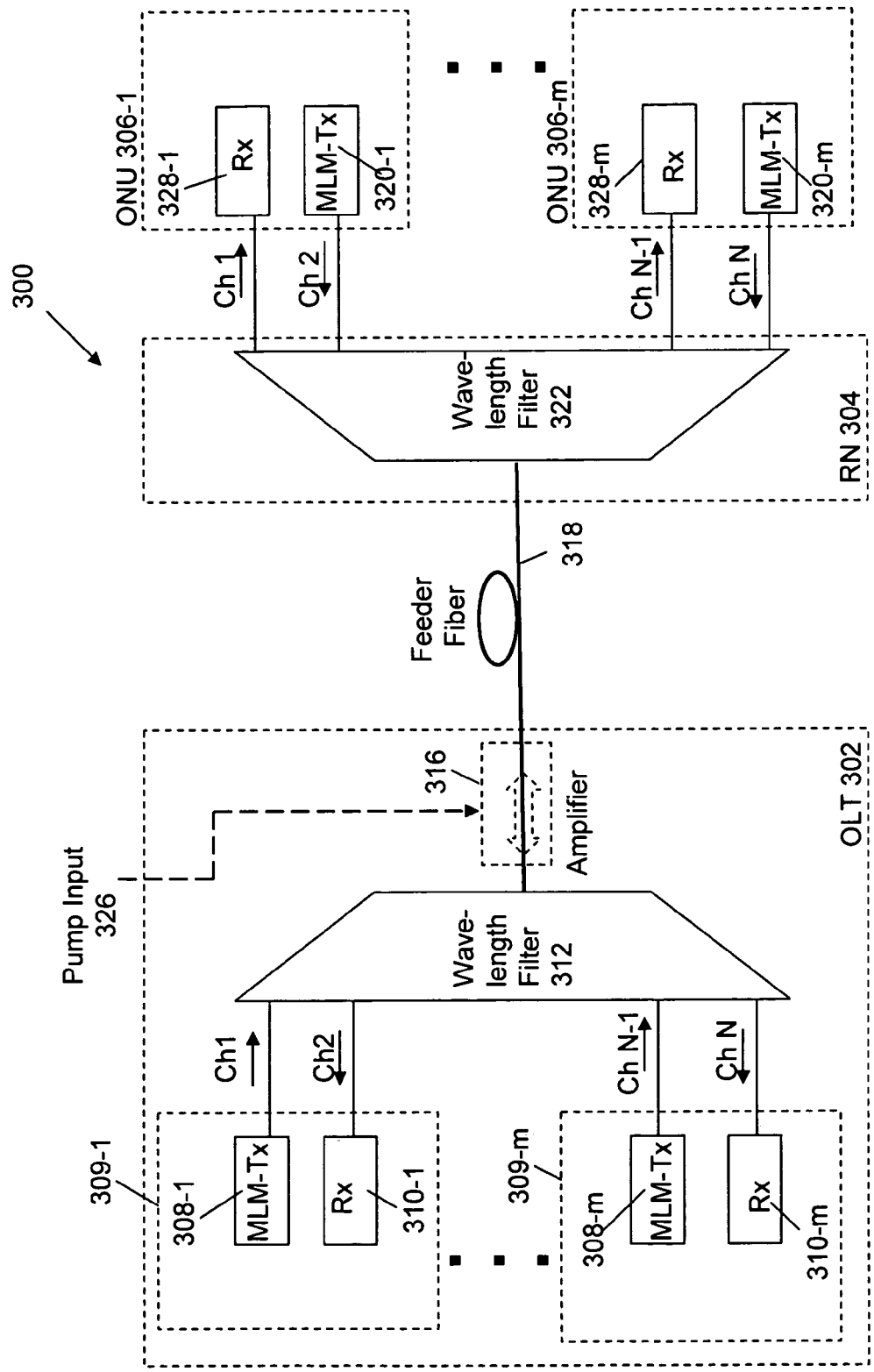
FIG. 3 is a block diagram of an optical communication system including MLM-source based transmitters in accordance to another embodiment of the present specification.

Another embodiment of the present specification is shown in FIG. 3. An optical communication system 300 is similar to the optical communication system 200 except for that the signal separating/combining devices in the OLT and ONUs (corresponding to 214-1 . . . 214-N and 224-1 . . . 224-N in FIG. 2A) are eliminated. The transmitters 308-1 . . . 308-m and the receivers 310-1 . . . 310-m in the transceiver ports 309-1 . . . 309-m are directly coupled to the separate optical wavelength channels of the wavelength filter 312. Each connection from the transmitters 308-1 . . . 308-m to the wavelength filter 312 only carries a downstream MLM signals for spectrum slicing. The connections between the wavelength filter 312 and the receivers 310-1 . . . 310-m only receive upstream spectrum-sliced signals routed by the wavelength filter 312 to the corresponding wavelength channels.

Similarly, the transmitters 328-1 . . . 328-m and the receivers 320-1 . . . 320-m in the ONUs 306-1 . . . 306-m are directly connected to the separate wavelength channels of the wavelength filter 322. The wavelength filter 322 receives MLM upstream signals exclusively from the transmitters 328-1 . . . 328-m and produces multiple spectrum-sliced signals multiplexed into the feeder fiber 318. The signals can be further amplified by an optional bi-directional optical amplifier 316 if necessary and then routed by filter 312 based on the wavelength channels to the respective receiver ports 310-1 . . . 310-m. The wavelength filter 322 routes downstream spectrum-sliced signals to the respective channels and further to the receivers 320-1 . . . 320-m for signal detection.

Figure 4A:
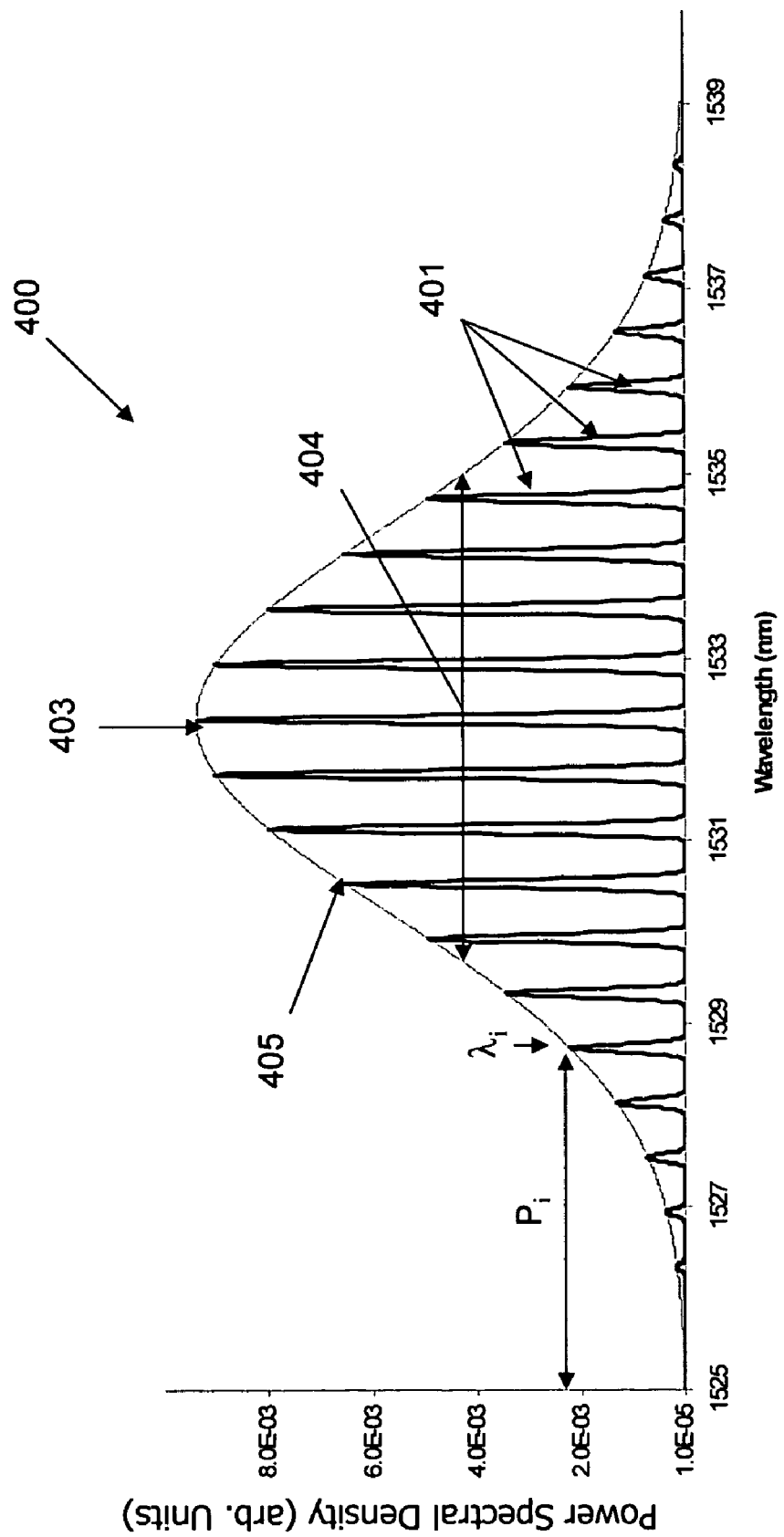
FIG. 4A illustrates the emission spectrum of an MLM source in accordance to the present specification.
Figure 4B:
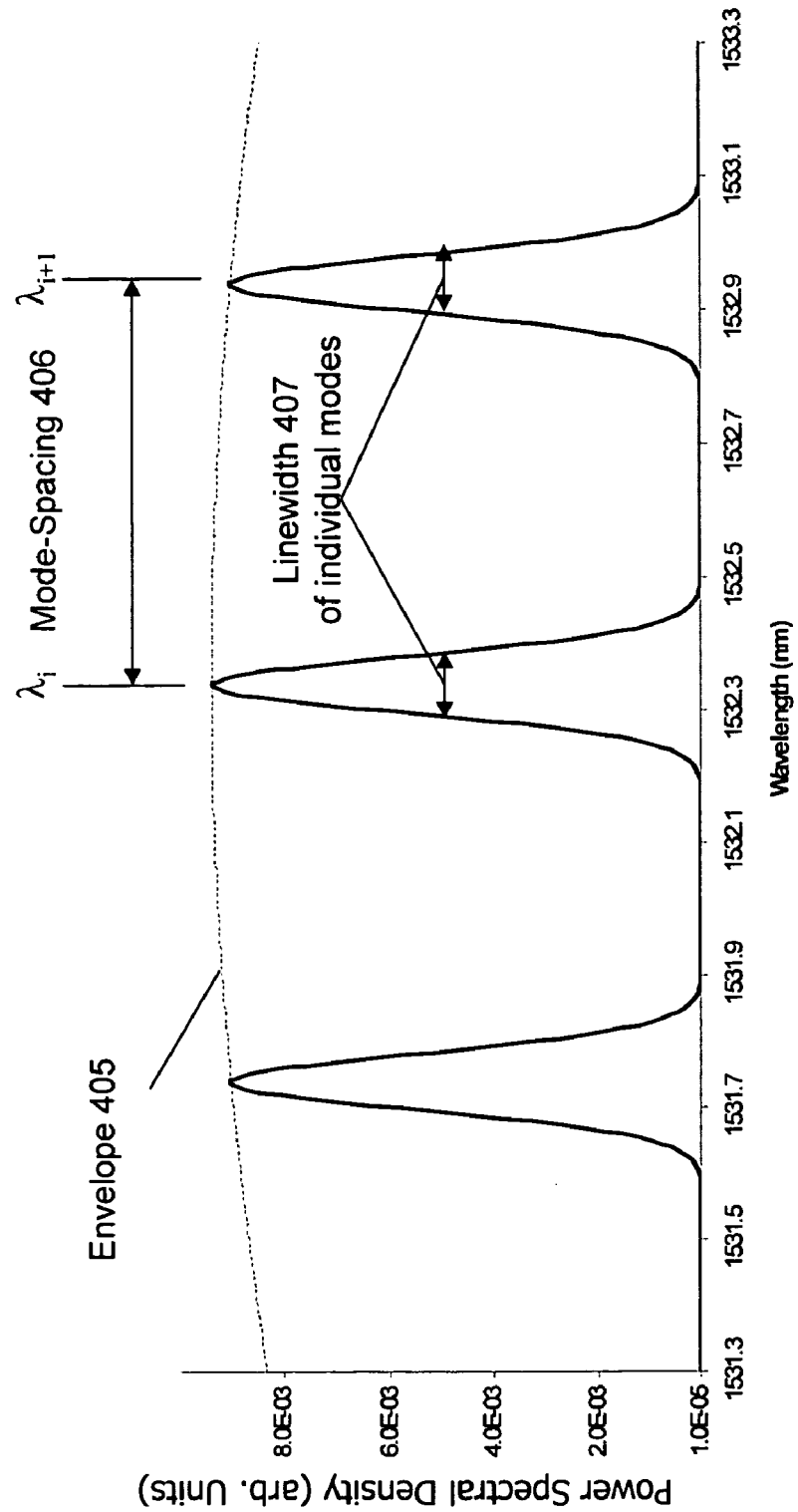
FIG. 4B is an expanded view of the emission spectrum of an MLM source illustrating the spectral profiles of individual modes and the spacing between the modes.

FIG. 4A illustrates the emission spectrum 400 of a typical MLM source. FIG. 4B is an expanded view of the emission spectrum of a typical MLM source. The emission spectrum 400 includes a plurality of individual emission modes 401. The envelope 405 of the individual emission modes 401 is formed by joining all the peaks of the modes 401, and only serves as a visual guide. In the present specification, the center wavelength (CW) 403 of the MLM emission spectrum is defined here by the weighed average of the peaks of the individual modes 401: $CW_{MLM}=\Sigma(p_i*\lambda_i)/\Sigma(p_i)$ where $p_i$ and $\lambda_i$ are the power (in linear units) and the center wavelength of individual modes respectively. The summation covers over all the peaks within 20 dB range of the strongest peak.

An effective width 404 of the MLM emission spectrum can be defined by the spectral FWHM of the envelope 405. The spectral width of envelope 405 of the MLM emission spectrum can commonly be represented by the full width at specific "x" decibel value (dB) below the maximum (PWxdB). The most common specification of the spectral width is the full width at half the maximum (FWHM), which is equivalently to PW3 dB. Analogously, the pass bands 415 of the wavelength channel of a wavelength filter can be defined in the same fashion and labeled as BWxdB. Each modal peak has a spectral line width 407. The spacing 406 between adjacent individual modes is defined by the wavelength difference between the neighboring peaks $\lambda_{i+1}-\lambda_i$. The line width (FWHM) 407 of an individual modal peak is typically much narrower than 1 nm. The mode spacing 406 is less than the spacing between the pass bands 415 of the wavelength filters.

FIGS. 4C illustrates the emission spectrum 400 of a MLM source in accordance with the present specification. The emission spectrum 400 includes a plurality of MLM modes 401 that are characterized by an envelope 405. FIG. 4D illustrates the emission spectrum 410 of a broad-spectrum source (BSS) in comparison with the pass bands 415 of the wavelength channels of the wavelength filters (i.e. 212, 222, 312 and 322). FIG. 4E illustrates the emission spectrum 420 of a narrow-spectrum source.

The emission spectra 400, 410, and 420 have rather different spectral widths, which affects how the three light sources can be used in an optical communication network and the performance of the optical systems. The effective FWHM 404 of the envelope of the emission spectrum 400 is greater than or equal to 1 nm. The FWHM 412 of the BSS emission spectrum 410 is typically in the range of 20 to 80 nm. In contrast, the FWHM 423 of the emission spectrum 420 of a narrow-spectrum source is narrower than 1 nm. The wavelength channels typically have pass band FWHM in the range of 0.3-0.7 nm for a typical 100 GHz spacing AWG-based wavelength filter.

As shown in FIGS. 4C and 4D, the spectral spacing between the MLM modes 401 is smaller than the spacing between the pass bands 415 of the wavelength channels of the wavelength filters (i.e. 212, 222, 312 and 322). Small temperature shift that causes certain MLM modes 401 to move out of a pass band 415 of the wavelength channel can be simultaneously compensated by other MLM modes 401 move into the pass band 415. This design feature significantly relaxes the precision for the temperature control for locking the emission wavelengths of the MLM light sources.

Figure 4F:
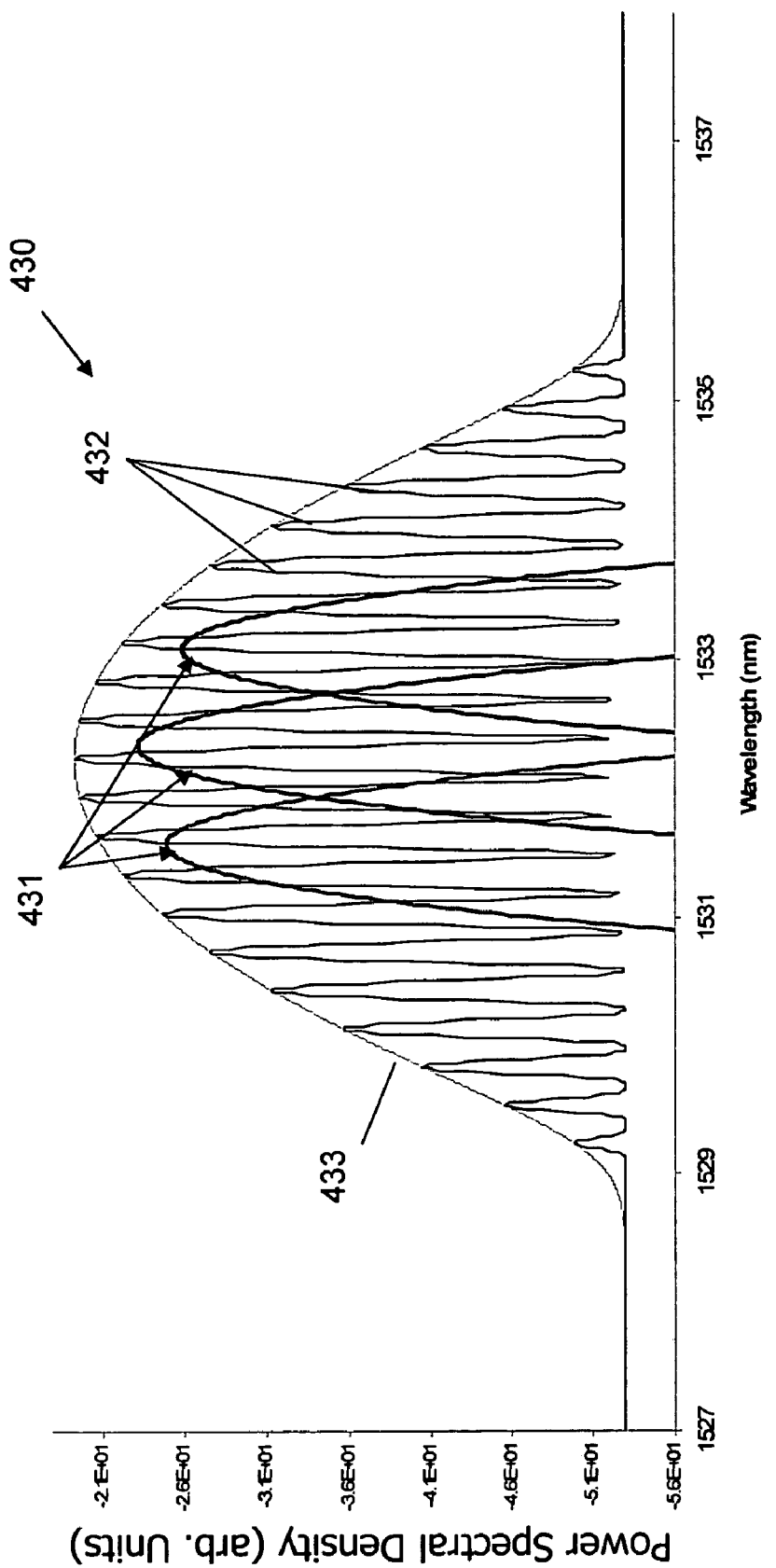
FIG. 4F illustrates the spectra of a MLM source relative to the wavelength channels of wavelength filter in the disclosed optical communication system.

FIG. 4F illustrates the emission spectrum of a MLM source 430 controlled at a specific temperature and the pass bands of several wavelength channels 431. The MLM source 430 includes a plurality of individual modes 432 whose peaks are characterized by an envelope 433. The MLM source is suitable for the transmitters in the optical communication system 200 and 300. FIG. 4F shows that spacing between the adjacent pass bands 431 of the wavelength channel is larger than the spacing between the MLM modes 432. Moreover, a single pass band 431 of a wavelength channel 431 can encompass several modes 432 in the MLM source 430. These features ensures that the pass band 431 of a wavelength channel can always encompass at least one MLM mode 432 even if the MLM emission spectrum 430 shifts due to thermal or other variations. Although the intensity of the transmission signal may vary somewhat due to the relative spectral positions of the MLM modes and the wavelength channels, the receivers (such as 210-1 . . . 210-N, 220-1 . . . 220-N) generally have wide dynamic ranges that can easily handle power variations of the MLM signals.

Figure 4G:
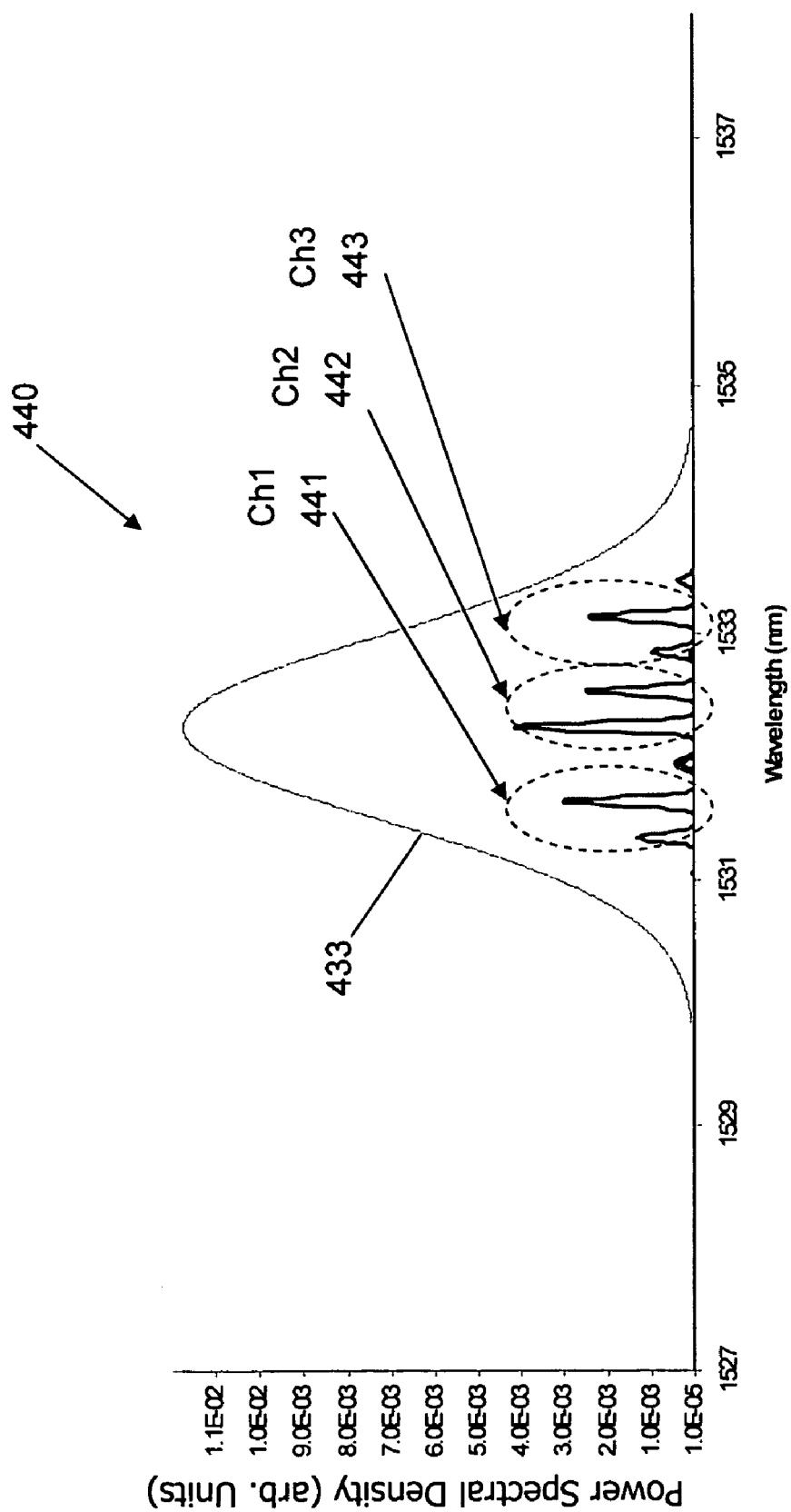
FIG. 4G illustrates the spectra of the spectrum-sliced signals produced by a wavelength filter using an MLM signal as input.

FIG. 4G illustrates the spectrum-sliced signals 441, 442, and 443 produced by a wavelength filter 212 (or 222) in response to an MLM source signal defined by the envelope 433 and individual models 432. The spectrum-sliced signals 441, 442, and 443 respectively correspond to wavelength channels "Ch1", "Ch2" . . . "ChN" in the wavelength filter. The spectrum-sliced signals of "Ch1", "Ch2", "Ch3" . . . and "ChN" can be separated by a fixed frequency or wavelength. The high isolation characteristics of the wavelength filters allow a large number of the wavelength channels 431 to be densely packed without significant interference from the neighboring wavelength channels.

Each spectrum-sliced signal 441, 442, and 443 passing its respective wavelength channel can include one or more MLM modes 432. In another embodiment, each spectrum-sliced signal 441, 442, and 443 passing a wavelength channel can include two or more MLM modes 432, as shown in FIG. 4F.

The spectrum-sliced signal 441, 442, and 443 sliced from the MLM source signals have several differences from the spectrum-sliced signals sliced from broad-spectrum source (BSS) 410 or the narrow-spectrum signals from the wavelength controlled DFB lasers. Comparing to the spectrum-sliced signals generated from BSS signals, the spectrum-sliced signal 441, 442, and 443 are much stronger because their spectral intensity of the MLM source is much more concentrated than the BSS sources, as shown in FIGS. 4C and 4D. The stronger spectrum-sliced signal 441, 442, and 443 can eliminate the need for optical amplifiers between the wavelength filters in the optical communications system 200 and 300 (see below for more detailed discussions). Comparing to the spectrum-sliced signals generated from narrow-spectrum signals of wavelength controlled DFB lasers, the spectrum-sliced signal 441, 442, and 443 are robust to emission spectral variations (e.g. temperature related variations) because the large number modes 432 within the emission envelope 433 of each MLM source 430.

In accordance to the present specification, the emission spectrum of a MLM source can be tuned like a tunable laser to cover part or all the wavelength channels of the wavelength filters 212, 222, 312 and 322. FIG. 5A illustrates the spectral distribution of the wavelength channels of the wavelength filters (e.g. 212, 222, 312, and 322) at center wavelengths $\lambda_1$ $\lambda_2 \ldots \lambda_N$. FIG. 5B illustrates the spectrum of a MLM source at two different temperatures $T_1$ and $T_2$. FIG. 5C illustrates the temperature dependence of the center wavelength of a typical MLM source. MLM sources such as the Fabry-Perot lasers have large temperature sensitivity, which allows the center wavelength of the emission spectrum of the MLM source to be tuned with relatively small variation of the temperature. For example, the temperature sensitivity of the emission wavelength of a Fabry-Perot laser can be >0.4 nm/° C. It is therefore possible to use transmitters based on the same Fabry-Perot laser to cover a large number (e.g. 32, 40 and 48) of the wavelength channels in a given optical communication system (e.g. 200, 300, 700, and 800). A 100 GHz spacing wavelength filter will occupy ~25 nm of spectral range for 32 channels in the C-band, A 50 degree of temperature tuning can cover the same spectral range for a temperature sensitivity factor of 0.5 nm/° C. The temperature controllers 251 and 261 as shown in FIGS. 2D and 2E can be controlled to set the MLM sources to different temperature set-points such that the respective transmitters can provide stable MLM source signal for wavelength channels in different wavelength ranges. It should be noted that the thermal tuning of the center wavelength of an emission spectrum is applicable to other optical sources such as LED and SLD sources.

The temperature and thus wavelength control of the transmitters 208-1 ... 208-N at the OLT 202 or the transmitters 228-1 ... 228-N at the ONUs 206-1 ... 206-N can be carried out separately through the following procedures. The transmitters 208-1 ... 208-N and 228-1 ... 228-N can automatically adapt to their corresponding wavelength channels at initial system startup or during continuing operation. If optical power monitors are implemented in the system, the wavelength tuning and locking of the MLM transmitters can include any one or all of the following three automatic approaches:

1) The slicing output power of each MLM transmitter 208-1 ... 208-N at OLT 202 can be independently measured using external or internal feedback monitors while tuning the temperature of individual MLM transmitters. The MLM transmitter 208-1 ... 208-N can then store and lock the optimal temperature that corresponds to the highest power reading from the feedback monitor as its initial coarse setting.

2) Each MLM transmitter 228-1 ... 228-N at ONU can be set into a passive (slave) state by the commands from OLT 202. Transmission power from each ONU can be measured at the OLT 202 while tuning the temperature of the remote transmitter 228-1 ... 228-N. The optimal temperature is again determined by the maximum power. The transmitter 228-1 ... 228-N can then be set and lock at the optimal temperature;

3) Each MLM transmitter 208-1 ... 208-N at OLT or MLM transmitter 228-1 ... 228-N at ONU can be set into an interactive state to conduct fine tuning of the center wavelength through interactive power feedbacks between the corresponding OLT and ONU nodes. For example, to fine tune the transmitters 208-1 ... 208-N at OLT, each transmitter tunes temperature and the final spectrum-sliced signal power are individually monitored at the corresponding ONU and reported back to OLT. The system at OLT can then select the peak power for the optimal temperature setting. To fine tune the ONU, each transmitters 228-1 ... 228-N at ONU tunes temperature while the corresponding OLT nodes recording reading. In the end, the OLT reports back to each ONU about its optimal settings, which can then be stored and locked in the local ONU controller.

In the case that optical power monitor for access is not implemented in an optical communication system, digital SD (Signal Detect) signal of each channel can be available as an internal feedback during normal operation. In this case, the temperature tuning and locking of the MLM transmitters can include any one or all of the following five automatic approaches:

1) The temperature coefficient of a MLM transmitter can be measured using external monitors while tuning the temperature of the MLM transmitters. This pre-calibrated data then can be stored at OLT 202. Usually, the temperature coefficients of same type of MLM sources have very good uniformity. Thus, the appropriate temperatures of MLM transmitter 208-1 ... 208-N at OLT 202 can be preset and locked by their temperature controllers. If the characteristics of the MLM sources, specifically the mode spacing and FWHM of the spectral envelope, meet certain design criteria, once the temperature of a MLM source is locked at the appropriate value, there is always at least one longitudinal mode can pass through the wavelength channel after slicing.

2) Each MLM transmitter 228-1 ... 228-N at ONU can receive commands from OLT 202 after the downstream links are established, which include the information of corresponding wavelength channel. Similarly, from the pre-calibrated data of temperature coefficient, the optimal temperature can be calculated then locked by its temperature controller. If the characteristics of the MLM sources, specifically the mode spacing and FWHM of the spectral envelope, meet certain design criteria, once the temperature of a MLM source is locked at the appropriate value, there is always at least one mode can pass through the wavelength channel after slicing.

3) In the case that the calibration data are not available, an in-service calibration process can automatically tune and lock the temperatures of MLM sources. For example, the transmitter 228-1 has an unknown temperature coefficient. It can sweep the temperature from low to high while sending out the real-time temperature information. Once spectrum of 228-1 shifts into and encompasses the corresponding wavelength channel "Ch1", the upstream link will be established and receiver 210-1 at OLT 202 will be able to record the current temperature of transmitter 228-1 at T1. When temperature of 228-1 keeps going up and finally at a point that the spectrum of the MLM source 228-1 moves out of the wavelength channel, the upstream link then will be disconnected. The receiver 210-1 at OLT 202 will be able to record the current temperature at T2. Then the optimal temperature for the transmitter 228-1 is the center point of T1 and T2. The information of the optimal temperature can be sent to ONU through the downstream link.

4) In the case that certain calibration data are not available and the mode spacing is too large, a mode counting process can automatically tune and lock the temperatures of MLM sources. The process is very similar to the in-service calibration described above. For example, the transmitter 228-1 has an unknown temperature coefficient and its mode spacing is too large. It can sweep the temperature from low to high while sending out the real-time temperature information. Once spectrum envelope of 228-1 shifts into and one of its modes locates in the corresponding wavelength channel "Ch1", the upstream link will be established. When temperature of 228-1 keeps going up, the mode will move out of the wavelength channel but before the next mode moves in, the upstream link will be disconnected. The receiver 210-1 at OLT 202 will be able to record the temperature of transmitter 228-1 at T1 for mode M1. Similarly, when second mode occupies the wavelength channel, the receiver 210-1 will be able to identify temperature T2 for mode M2, and so on. Finally at a point that the last mode of the MLM source 228-1 moves out of the wavelength channel, the receiver 210-1 at OLT 202 will be able to record the temperature Tk for mode Mk. Then the optimal temperature for the transmitter 228-1 is the temperature when the center mode occupies wavelength channel "Ch1". The information of the optimal temperature can be sent to ONU through the downstream link.

5) The automatic tuning methods described in 3) and 4) can be utilized to identify and lock the temperatures of the transmitters at OLT, and also can be utilized simultaneously to set the temperatures of a pair of transmitters at OLT and ONU.

It is important to note that although the above described procedures for setting center wavelengths for MLM source transmitters is not limited to the MLM source. The same procedure for center wavelength tuning, locking, and refining is also applicable to other types of light sources such as narrow-spectrum source transmitter (DFB laser etc.) or broad-spectrum source transmitter.

The concentrated power spectral density of MLM source can overcome the drawback of high slicing loss facing broad-spectrum sources in the WDM based optical communication system. The slicing loss can be even below 10 dB if the spectral FWHM of the MLM source envelope matches the FWHM of the channel pass band profile of the wavelength filter. Low loss is required to achieve high link budget in the system, which is necessary for high-speed data transmission. MLM Fabry-Perot lasers, on the other hand, have been widely deployed for 2.5 Gbps data transmission. This makes MLM FP an ideal choice for high-speed data transmission even without the use of optical amplifier.

The optical communication system 200 can include an optional optical amplifier 216 (either bi- or uni-directional) in the OLT 202. The optical amplifier 216 can be optically coupled with the wavelength filter 212 in the OLT 202, and with the wavelength filter 222 through a common feeder fiber 218. The optical amplifier 216 can be energized by an external shared pump source 226 among multiple system 200. Since an active pump source is not required locally within the OLT 202, the optical amplifier can be referred to as a "passive optical amplifier" or "passive amplet."

Either downstream or upstream or both downstream and upstream optical signals can be amplified by the optional optical amplifier 216. For downstream communication, the transmitters 208-1 . . . 208-N provide input of downstream optical signals to the wavelength filter 212. The output of the wavelength filter 212 is multiple spectrum-sliced signals each corresponding to the specific wavelength channel of the filter 212. The multiplexed downstream spectrum-sliced signals output from the common port 212c can be amplified by the optical amplifier 216 and transmitted down the feeder fiber 218. For upstream communication, the upstream spectrum-sliced signals from the wavelength filter 222 at the RN 204 travel over the feeder fiber 218 (e.g., 20 km long) before they could be amplified by the optional optical amplifier 216. The choice of transmitter center wavelength range inside or outside the optical amplifier window determines whether the signal will be selectively amplified or not.

The optical communication system 200 using MLM source can also operate without the optical amplifier 216. As discussed above, the spectrum-sliced signals 441, 442, and 443 can be much stronger than the spectrum-sliced signals sliced from BSS signals because the spectral intensity of the MLM source is much more concentrated than the BSS sources. The spectrum-sliced signals 441, 442, and 443 can thus be strong enough to propagate through the feeder fiber 218 and the wavelength filter 222, and still be properly detected by the receivers 220-1 . . . 220-N.

Figure 7:
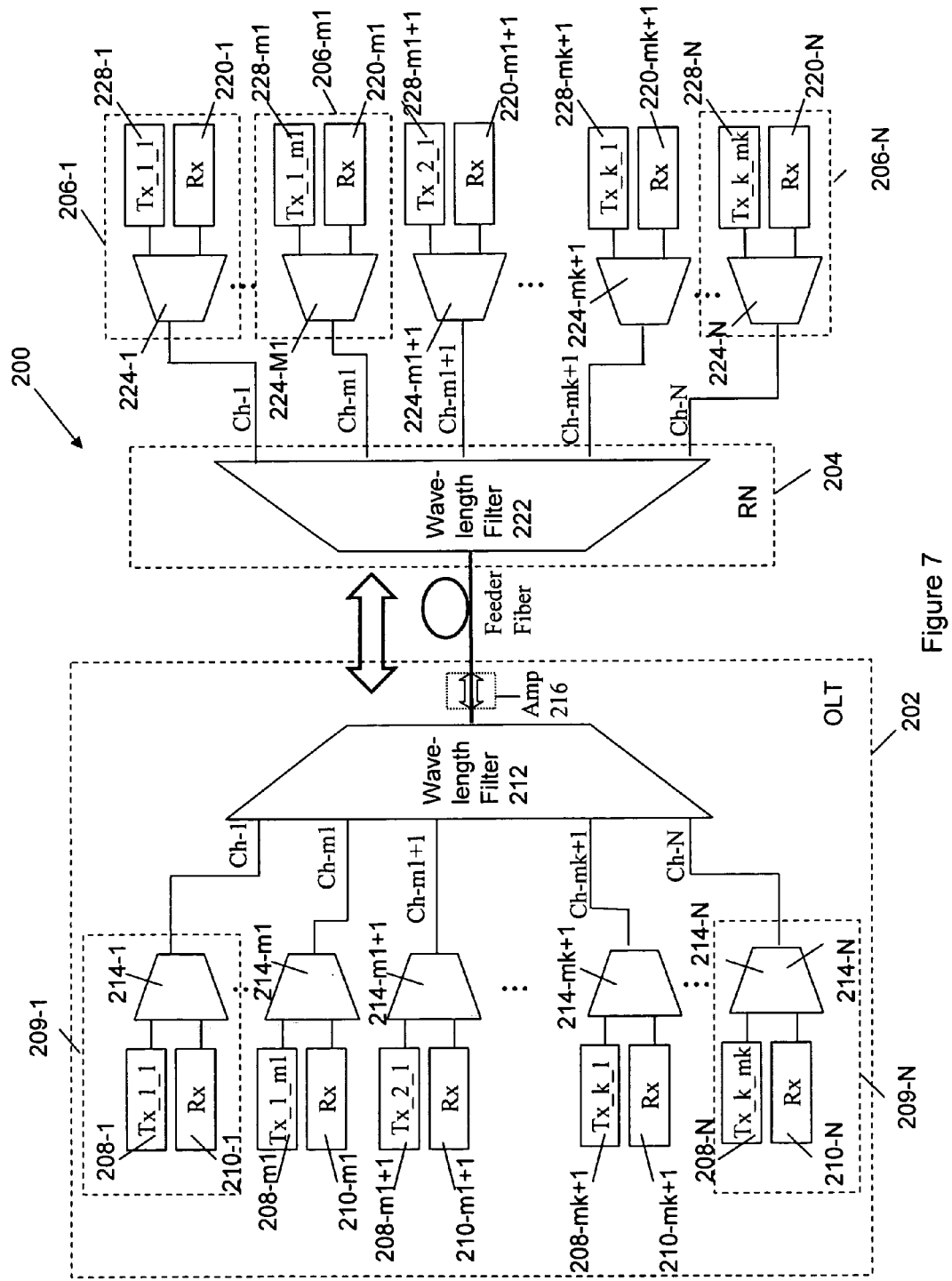
FIG. 7 is a block diagram illustrating the configuration of MLM sources for providing optical signals for a plurality of wavelength channels of the wavelength filters in an optical communication system.

FIG. 7 is a detailed block diagram for the optical communication system 200 illustrating the configurations of the transmitters 208-1 . . . 208-N based on MLM sources. As discussed above in relation with FIG. 2, the wavelength filter 212 or 222 can provide filtering and routing of optical signals in a plurality of wavelength channels through a plurality of branching ports 212b1 . . . 212bN. Each branching ports 212b1 . . . 212bN is connected with a transceiver port 209-1 . . . 209-N. Each transceiver port can include a transmitter, a receiver, and a signal separating/combining device that facilitates the communication between the wavelength filter 212 and the transmitter and the receiver within the same transceiver port. For example, the transceiver port 209-1 can include a transmitter 208-1, a receiver 210-1, and a signal separating/combining device 214-1.

Each transmitter 208-1 . . . 208-N includes an MLM source and a temperature controller that controls the temperature of the MLM source. For example, the transmitter 208-1 includes an MLM 250 and a temperature controller 251 that is thermally coupled with the MLM 250. The characteristic emission spectrum for the MLM 251 is illustrated as the emission spectrum 400 in FIG. 4C and the emission spectrum 430 in FIG. 4F.

As shown in 5C, the center wavelength of the MLM emission spectrum can shift as a function of temperature. For example, FIGS. 5B illustrates MLM spectra 520 and 525 at two different temperatures $T_1$ and $T_2$. The MLM emission spectrum 520 has a center wavelength 521. The MLM emission spectrum 525 has a center wavelength 526. In accordance with an aspect of the specification, the temperature dependence of the MLM sources is exploited to configure the MLM sources to provide optical emissions for all the wavelength channels of the wavelength filter 212 and 222. The transceiver ports 209-1 . . . 209-N are divided into a plurality of groups. The transmitters 208-1 . . . 208-M1 belong to the first group of transceiver ports. The transmitters 208-M1+1 . . . 208-M2 belong to the second group, and so on. The transceivers 208-Mk+1 . . . 208-N belong to the (k+1)th group, wherein M1, M2 . . . Mk, N and k are all integer numbers and $1 \leq M1 \leq M2 \ldots \leq N$.

The MLM sources in each group of transmitters can be set to a common temperature such that their emission spectra essentially cover the same spectral range. For example, the first group of transmitters 208-1 . . . 208-M1 can have their MLM sources set at temperature $T_1$, as shown in FIG. 5B. The MLM emission spectrum 520 can provide optical emissions for a plurality of wavelength channels 510. The control temperature for the MLM sources in the second group of the transmitters 208-M1+1 . . . 208-M2 is shifted higher to cover the wavelength channels at slightly longer wavelength range. Similarly, the control temperatures for the other groups of transmitters are progressively raised to cover the wavelength channels at longer wavelength ranges. Finally, the MLM sources in the kth group of transceivers 208-Mk+1 . . . 208-N are set to temperature $T_2$ to provide an emission spectrum 525 cover the wavelength channels 515 at the longer end of the wavelength spectrum, as shown in FIGS. 5A and 5B.

The MLM sources of the transceivers within each group are set at the same temperature and thus share the essentially the same emission spectrum. For example, the first group of transmitters 208-1 . . . 208-M1 can have their MLM sources set at temperature $T_1$. The MLM sources in this group share the same emission spectrum 520 having a center wavelength 521. Because of the broad envelope of the emission spectrum 520 (also shown as envelope 405 as shown in FIG. 4A), the MLM emission spectrum 520 can encompass several wavelength channels "Ch-1", "Ch-2" . . . "Ch-m1" as shown in FIGS. 5A and 7.

The MLM sources in the same transmitter groups and in the different transmitters groups in one OLT 202 can be substantially the same except the MLM sources in the different transmitters groups are set to different control temperatures. The common MLM sources for different channels in an OLT 202 can greatly reduce the number of transmitter types that need to be kept in inventory. The simplification of using common MLM sources can be a crucial advantage for large scale deployment of optical network to the premises.

The above described approach of setting the control temperatures for tuning the emission spectra of the MLM sources in the transmitters 208-1 . . . 208-N at the OLT 202 is also applicable to the MLM-based transmitters 218-1 . . . 228-N at the ONUs 206-1 . . . 206-N for tuning their respective emission spectrum to the wavelength channels of the wavelength filter 222. The temperature setting and wavelength tuning of the MLM sources for the transmitters at the OLT and the ONUs are similarly applicable to the optical communication system 300.

Service add-on in the disclosed system can be fully automatic. The transmitters 208-1 . . . 208-N based on MLM sources can be automatically tuned to the wavelength range of the wavelength channels the branching ports that transmitters 208-1 . . . 208-N are respectively connected with. When a new ONU is connected to the system, the receiver in the ONU is able to receive the downstream signals in the same wavelength channel from the counterpart transceiver port in the OLT 202. The ONU can set its transmitter to a temperature based on the calibration data stored at the ONU.

In the above described approach, the temperature control range is fairly large in order to cover all wavelength channels of the system. For example, if the MLM transmitter has a temperature coefficient of 0.5 nm/° C., the temperature control range is more than 50° C. in order to cover a 32-channel system at 100 GHz spacing. A large temperature control range tends to require high power consumption, more thermal dissipation, shorter device lifetime, and lower reliability.

Figure 6A:
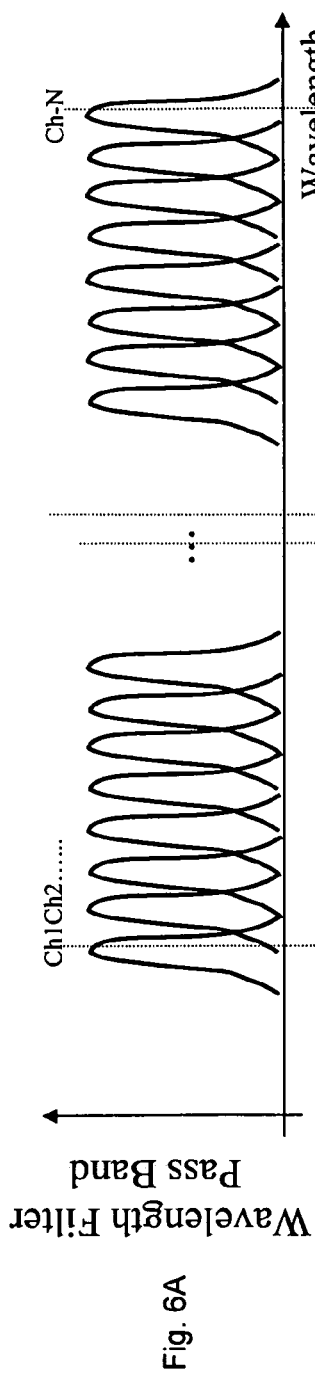
FIG. 6A illustrates the spectral distribution of the wavelength channels of the wavelength filters.
Figure 6B:
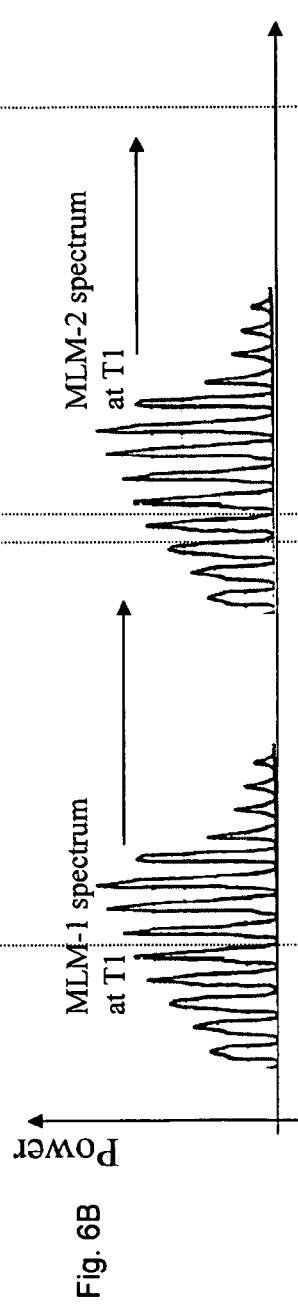
FIG. 6B illustrates the spectrum of two different MLM sources at the same temperatures $T_1$.
Figure 6C:
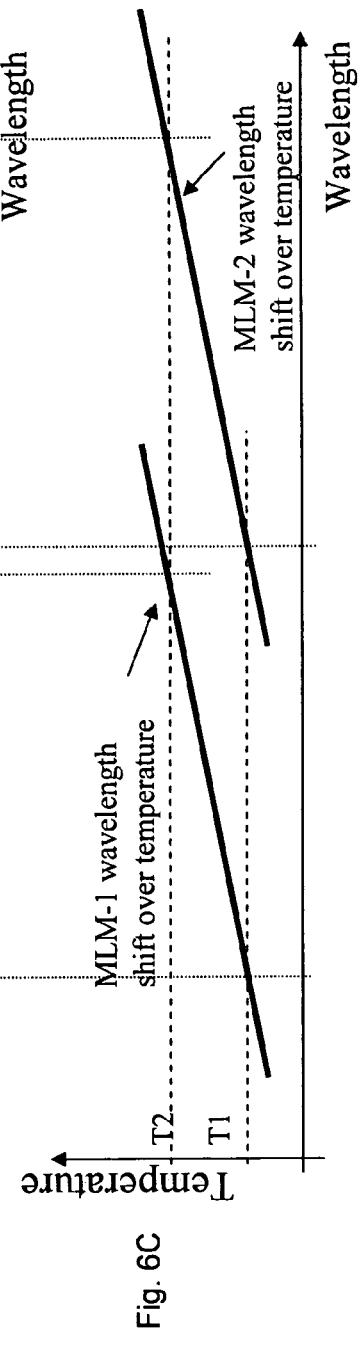
FIG. 6C illustrates the temperature dependence of the center wavelengths of the two MLM sources.

The temperature control range of the MLM sources in the transmitters can be decreased by providing a multiple of MLM sources having different center wavelengths. FIG. 6A illustrates the spectral distribution of the wavelength channels of the wavelength filters. FIG. 6B illustrates the spectrum of two different MLM source at same temperatures $T_1$. FIG. 6C illustrates the temperature dependence of the center wavelengths of the two MLM sources. The central wavelength of the MLM emission spectrum of a MLM source can vary by the proper design of device parameters. The entire spectrum of all wavelength channels "Ch1", "Ch2" . . . "ChN" can be divided to a few color bands. A different color band corresponds to a different MLM source with a central wavelength specifically designed for the band. A plurality of transceiver groups can use MLM sources having the same color band (i.e. having the same central wavelength). Each transceiver group can consist of a plurality of transceiver ports. As described before, the MLM sources in each transceiver group can be tuned to a wavelength channel by setting to a proper temperature. The wavelength channels can thus be covered by a combination of varying the MLM sources having different color bands and temperature control.

The MLM sources in the same color band but in the different transmitters groups in OLT 202 can be substantially the same except the MLM sources in the different transmitters groups are set to different control temperatures. Applying multiple color-banded MLM sources in the system will reduce the overall temperature control range for each MLM source, which can be seen by comparing the spans of temperature ranges for the center wavelength in FIGS. 5c and 6c.

Figure 8:
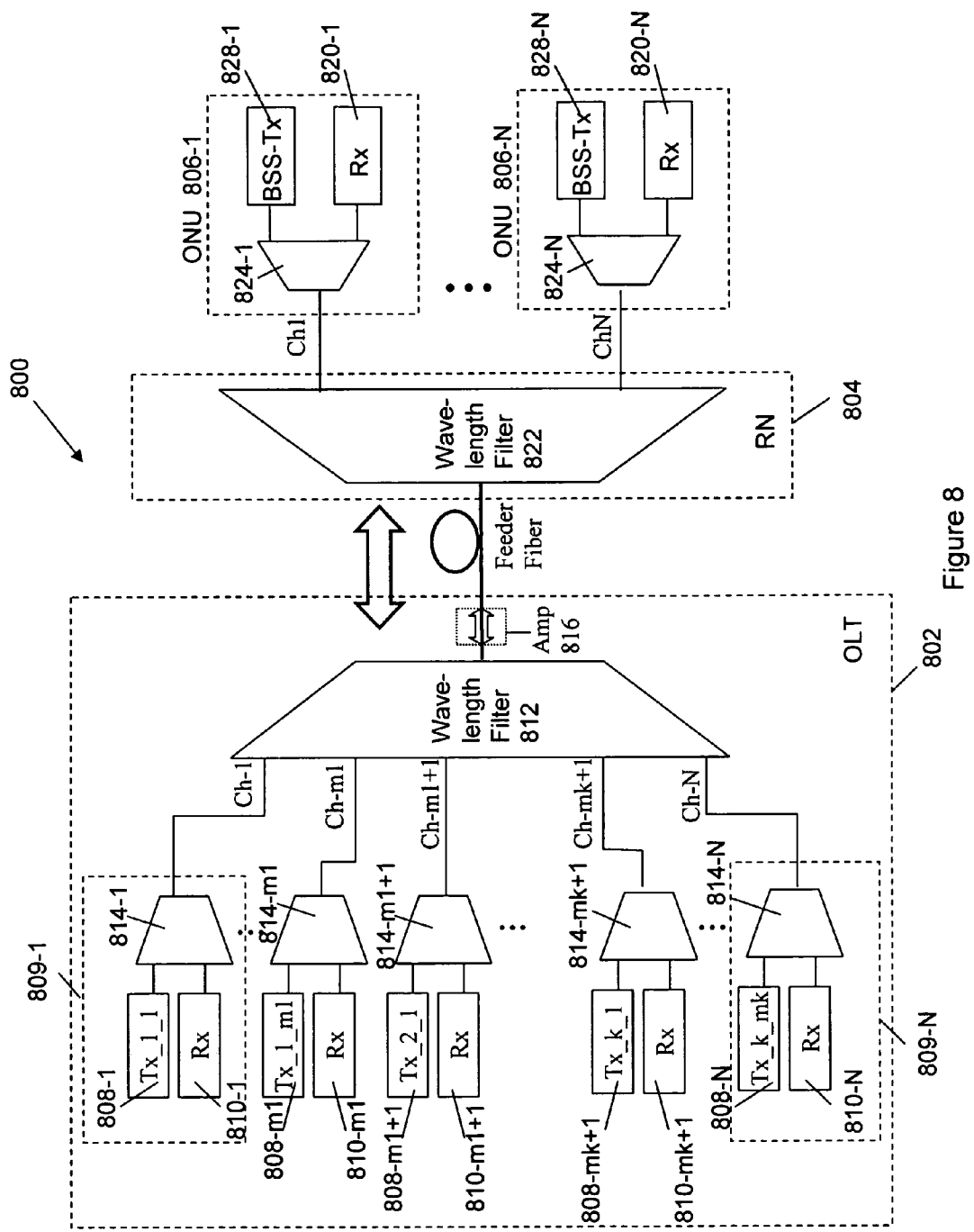
FIG. 8 is a block diagram of a hybrid optical communication system including MLM sources and broad-spectrum sources.

FIG. 8 is a block diagram of a hybrid optical communication system 800 including MLM sources and broad-spectrum sources. MLM transmitter can significantly increase bandwidth for each channel, but it needs a temperature controller to maintain its central wavelength. The temperature tuning process should be automatic without any manual adjustment, especially on ONU sides. In addition, when multiple banded MLM transmitters are utilized to minimize the temperature control range, it is intrinsically difficult to manage in the field. In some applications, upstream bandwidth requirement is much smaller than that of downstream signal. Thus one way of resolving ONU temperature control issue is the mixing use of MLM transmitters 808-1 . . . 808-N in OLT and BSS transmitters 828-1 . . . 828-N in ONU. Such structure can also lead to asymmetric transmission speed between the downstream and upstream traffics.

Service add-on in this hybrid optical communication system 800 is more convenient. Transmitters in OLT 802 are disabled if there are no ONUs connected in the corresponding wavelength channels. A new transmitter 828-1 added to an ONU (e.g. ONU 806-1) does not need to be tuned for the upstream signal to be received by the corresponding receiver 810-1 in the OLT 802 because of the broad emission spectrum of the transmitter 828-1. Upon the receipt of the upstream signal of the new ONU, transceiver port 809-1 automatically set the temperature of transmitter 808-1. When the central wavelength of transmitter 808-1 stabilized and encompasses wavelength channel "Ch-1", both downstream and upstream connections are established.

In both cases above, optional optical amplifiers 216 and 816 can be implemented to provide extra boost of signals. The actual implementation of the optical amplifiers can be either unidirectional or bi-directional depending on the specific link budget requirements. The configuration of amplifying the downstream signals and/or the upstream signals for special purposes such as extra long reach, ultra high speed or for some mixed use of transmitter between BSS and MLM.

It is understood that the disclosed systems and methods are compatible with other configurations of the filter, the optical transmitter, the optical receiver, and optional optical amplifiers. For example, the MLM sources in the disclosed optical communication system can include temperature controlled super luminescent diode and its variants. the filter is not limited to the example of AWG described above. The MLM sources for the transmitters are also not limited to the examples provided above. Other examples of the filter include thin-film based optical filters. The optical amplifiers can take various forms, such as EDFA, SOA or the combination of SOA and EDFA for downstream and upstream signals. The configuration of various communication devices in the disclosed system can also vary from what is described and depicted above. Wavelengths and bandwidths different from the examples described above can also be used in the broad-spectrum or the narrow-spectrum signals without deviating from the spirit of the specification. Furthermore, the bidirectional optical amplifier disclosed above can be applied to a TDM optical network and a hybrid TDM/WDM optical network.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. An optical communication system, comprising:
a) a plurality of transceiver ports each comprising:
a first transmitter configured to produce a downstream multi-longitudinal mode (MLM) spectrum signal, wherein the spectrum of the downstream MLM-spectrum signal comprises a plurality of distinct narrow-spectrum peaks each corresponding to a longitudinal mode;
a first temperature controller configured to vary the temperature of the first transmitter to tune the spectrum of the downstream MLM-spectrum signal; and
a first receiver configured to receive an upstream spectrum-sliced signal;
b) a first wavelength filter, comprising:
a plurality of first branching ports each associated with a specific wavelength channel, wherein each of the first branching ports is in connection with a transceiver port and is configured to receive the downstream MLM-spectrum signal from the first transmitter and send the upstream spectrum-sliced signal to the first receiver, wherein the first temperature controller in the transceiver port is configured to lock at least one of the plurality of distinct narrow-spectrum peaks in the spectrum of the downstream MLM-spectrum signal to the specific wavelength channel; and
a first common port configured to output a downstream filtered signal in response to the downstream MLM-spectrum signal, wherein the downstream filtered signal comprises at least one longitudinal mode of the downstream MLM-spectrum signal and the spectrum of the downstream filtered signal is located in a wavelength channel specifically associated with the first branching port at which the downstream MLM-spectrum signal is received; and
c) a second wavelength filter, comprising:
a plurality of second branching ports each associated with a specific wavelength channel, wherein each of the second branching ports is configured to receive an upstream broad-spectrum signal from an optical network unit; and
a second common port configured to output the upstream spectrum-sliced signal in response to the upstream broad-spectrum signal, wherein the spectrum of the upstream spectrum-sliced signal is a portion of the upstream broad-spectrum signal and is located in a wavelength channel specifically associated with the second branching port at which the upstream broad-spectrum signal is received, and wherein the second common port is configured to receive the downstream filtered signal from the first wavelength filter and the downstream filtered signal is routed to one of the second branching ports that is specifically associated with the wavelength channel of the downstream filtered signal.

2. The optical communication system of claim 1, wherein the first transmitter is a Fabry-Perot laser.

3. The optical communication system of claim 1, wherein the first temperature controller is configured to change the temperature of the first transmitter and to control the temperature of the first transmitter at a predetermined temperature.

4. The optical communication system of claim 1, wherein the first temperature controller is configured to tune the temperature of the first transmitter in the associated first transceiver port in response to an external signal.

5. The optical communication system of claim 1, further comprising:
an optical amplifier configured to amplify the upstream spectrum-sliced signal from the second common port of the second wavelength filter and to send an amplified upstream signal to the first common port of the first wavelength filter.

6. The optical communication system of claim 1, wherein the plurality of distinct narrow-spectrum peaks in the spectrum of the downstream MLM-spectrum signal are characterized by an envelope whose full-width at half the maximum (FWHM) is wider than the spectral range of two adjacent wavelength channels in the plurality of first branching ports.

7. The optical communication system of claim 1, wherein the spectral full-width at half the maximum of the upstream broad-spectrum signal is wider than the spectral range of two adjacent wavelength channels in the plurality of second branching ports.

8. The optical communication system of claim 1, wherein at least one of the transceiver ports comprises:
a first signal separating/combining device configured to receive the downstream MLM-spectrum signal from the first transmitter and to send the downstream MLM-spectrum signal to the associated first branching port in the first wavelength filter, and configured to receive the upstream spectrum-sliced signal from the associated first branching port in the first wavelength filter and to send the upstream spectrum-sliced signal to the first receiver.

9. The optical communication system of claim 1, wherein the first wavelength filter is configured to route the upstream spectrum-sliced signal received at the first common port to one of the first branching ports such that the center wavelength of the upstream spectrum-sliced signal matches the specific wavelength channel associated with the one of the first branching ports.

10. The optical communication system of claim 1, wherein the optical network unit comprises:
a second receiver configured to receive the downstream filtered signal from the second branching port in connection with the optical network unit; and
a second transmitter configured to produce the upstream broad-spectrum signal to be sent to the second branching port in connection with the optical network unit.

11. The optical communication system of claim 1, wherein the spectrum of the upstream broad-spectrum signal has FWHM wider than the spectral range of two adjacent wavelength channels in the plurality of second branching ports.

12. An optical communication system, comprising:
a) a plurality of transceiver ports each comprising:
a first transmitter configured to produce a downstream MLM-spectrum signal, wherein the emission spectrum of the downstream MLM-spectrum signal comprises a plurality of distinct narrow-spectrum peaks each corresponding to a longitudinal mode of the first transmitter and wherein the emission spectrum is configured to shift in wavelength in response to a change in temperature, and wherein at least two first transmitters in two of the plurality of transceiver ports are controlled at different temperatures by their respective temperature controllers such that the emission spectra of the two first transmitters cover substantially different wavelength ranges;
a first temperature controller configured to vary the temperature of the first transmitter to tune the spectrum of the downstream MLM-spectrum signal in response to an external signal; and
a first receiver configured to receive a filtered upstream signal; and
b) a first wavelength filter, comprising:
a plurality of first branching ports each associated with a specific wavelength channel, wherein each of the first branching ports is in connection with a transceiver port and is configured to receive the downstream MLM spectrum signal from the first transmitter and send the filtered upstream signal to the first receiver, wherein the emission spectrum of each of the first transmitter in the plurality of transceiver ports covers at least three adjacent wavelength channels associated with the first branching ports; and a first common port configured to output a downstream filtered signal in response to the downstream MLM spectrum signal and to receive the filtered upstream signal, wherein the spectrum of the downstream filtered signal is located in a wavelength channel specifically associated with the first branching port at which the downstream MLM spectrum signal is received and the downstream filtered signal comprises at least one longitudinal mode of the downstream MLM spectrum signal.

13. The optical communication system of claim 12, wherein at least one of the first transmitters is controlled at a first temperature and at least one of the first transmitters is controlled at a second temperature, wherein the first transmitter controlled at the first temperature is configured to cover at least one wavelength channel that is outside of the emission spectrum of the first transmitter controlled at the second temperature.

14. The optical communication system of claim 12, wherein the emission spectrum of the downstream MLM-spectrum signal produced by the first transmitter in each of the plurality of transceiver ports is characterized by a center wavelength, wherein the emission spectra of the MLM-spectrum downstream signals produced by at least two first transmitters in two of the plurality of transceiver ports have substantially different center wavelengths when the two first transmitters are controlled to be at the substantially same temperature by their respective first temperature controllers.

15. The optical communication system of claim 14, wherein the difference between the center wavelengths of the two first transmitters is equal to or larger than eight times of the wavelength difference between adjacent wavelength channels of the first wavelength filter.

16. The optical communication system of claim 12, wherein the plurality of distinct narrow-spectrum peaks in the spectrum of the downstream MLM-spectrum signal are characterized by an envelope whose full-width at half the maximum (FWHM) is wider than the spectral range of two adjacent wavelength channels in the plurality of first branching ports.

17. The optical communication system of claim 12, wherein the first transmitter is a Fabry-Perot laser.

18. The optical communication system of claim 12, wherein the first wavelength filter is configured to route the filtered upstream signal received at the first common port to one of the first branching ports such that the central wavelength of the filtered upstream signal matches the specific wavelength channel associated with the one of the first branching ports.

19. The optical communication system of claim 12, further comprising a second wavelength filter that comprises:

a plurality of second branching ports each associated with a specific wavelength channel, wherein each of the second branching ports is configured to receive an upstream MLM spectrum signal from an optical network unit; and a second common port configured to output the filtered upstream signal in response to the upstream MLM spectrum signal, wherein the spectrum of the filtered upstream signal is located in a wavelength channel specifically associated with the second branching port at which the upstream MLM spectrum signal is received, and wherein the filtered upstream signal comprises one or more longitudinal modes of the upstream MLM-spectrum signal.

20. The optical communication system of claim 19, wherein the second wavelength filter is an athermal arrayed-wavelength grating.

21. The optical communication system of claim 19, wherein the second common port is configured to receive the downstream filtered signal from the first wavelength filter and the downstream filtered signal is routed to one of the second branching ports that is specifically associated with the wavelength channel of the downstream filtered signal.

22. The optical communication system of claim 19, wherein the optical network unit comprises:

a second receiver configured to receive the downstream filtered signal from the second branching port in connection with the optical network unit;

a second transmitter configured to produce the upstream MLM spectrum signal to be sent to the second branching port in connection with the optical network unit, wherein the emission spectrum of the MLM spectrum signal is configured to shift in wavelength in response to a change in temperature; and a second temperature controller configured to tune the temperature of the second transmitter in response to an external signal.

23. The optical communication system of claim 22, wherein the upstream MLM-spectrum signal comprises a plurality of distinct narrow-spectrum peaks each corresponding to a longitudinal mode in the second transmitter, wherein the plurality of distinct narrow-spectrum peaks in the spectrum of the upstream MLM-spectrum signal are characterized by an envelope whose full-width at half the maximum (FWHM) is wider than the spectral range of two adjacent wavelength channels in the plurality of second branching ports.

24. The optical communication system of claim 22, wherein a first GNU includes a second transmitter controlled at a first temperature and a second GNU includes a second transmitter controlled at a second temperature, wherein the second transmitter controlled at the first temperature is configured to cover at least one wavelength channel that is outside of the emission spectrum of the second transmitter controlled at the second temperature.

25. The optical communication system of claim 22, wherein the emission spectrum of the upstream MLM-spectrum signal produced by the second transmitter in each of the plurality of ONUs is characterized by a center wavelength, wherein the emission spectra of the upstream MLM-spectrum signals produced by two second transmitters in two ONUs have substantially different center wavelengths when the two second transmitters are controlled to be at the substantially same temperature by their respective second temperature controllers.

26. The optical communication system of claim 25, wherein the difference between the center wavelengths of the two second transmitters is equal to or larger than three times of the wavelength difference between adjacent wavelength channels of the second wavelength filter.

27. An optical communication system, comprising:

a) a first transceiver port, comprising:

a first transmitter configured to produce a first downstream MLM-spectrum signal, wherein the emission spectrum of the first downstream MLM-spectrum signal comprises a plurality of distinct narrow-spectrum peaks each corresponding to a longitudinal mode of the first transmitter; and a first temperature controller configured to vary the temperature of the first transmitter to tune the first downstream MLM-spectrum signal to lock to one of a first group of wavelength channels;

b) a second transceiver port, comprising:

a second transmitter configured to produce a second downstream MLM-spectrum signal, wherein the emission spectrum of the second downstream MLM-spectrum signal comprises a plurality of distinct narrow-spectrum peaks each corresponding to a longitudinal mode of the second transmitter; and a second temperature controller configured to vary the temperature of the second transmitter to tune the second downstream MLM-spectrum signal to lock to one of a second group of wavelength channels that are different from the first group of wavelength channels; and c) a wavelength filter, comprising:

a first branching port associated with one of first group of wavelength channels and configured to receive the downstream MLM spectrum signal from the first transmitter;

a second branching port associated with one of second group of wavelength channels and configured to receive the downstream MLM spectrum signal from the second transmitter; and a common port configured to output a downstream filtered signal in response to the first downstream MLM spectrum signal or the second downstream MLM spectrum signal, wherein the first downstream MLM spectrum signal and the second downstream MLM spectrum signal are respectively associated with one of the first group of wavelength channels or one of the second group of wavelength channels.

28. The optical communication system of claim 27, wherein the first downstream MLM spectrum signal and the second downstream MLM spectrum signal are locked to different wavelength channels even when the first transmitter and the second transmitter are controlled at a same temperature respectively by the first temperature controller and the second temperature controller.

* * * * *